(12) United States Patent
Shida et al.

(10) Patent No.: US 10,565,033 B2
(45) Date of Patent: Feb. 18, 2020

(54) EVENT MANAGEMENT SERVER, INFORMATION PROCESSING APPARATUS, INFORMATION PROCESSING SYSTEM, AND EVENT REALIZING METHOD

(71) Applicant: Sony Interactive Entertainment Inc., Tokyo (JP)

(72) Inventors: Noriko Shida, San Mateo, CA (US); Takuma Oiwa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/069,420

(22) PCT Filed: Feb. 16, 2017

(86) PCT No.: PCT/JP2017/005715
§ 371 (c)(1),
(2) Date: Jul. 11, 2018

(87) PCT Pub. No.: WO2017/145908
PCT Pub. Date: Aug. 31, 2017

(65) Prior Publication Data
US 2019/0026165 A1    Jan. 24, 2019

(30) Foreign Application Priority Data

Feb. 23, 2016 (JP) .................................. 2016-032514

(51) Int. Cl.
*G06F 9/54* (2006.01)
*G06F 9/455* (2018.01)

(52) U.S. Cl.
CPC .......... *G06F 9/542* (2013.01); *G06F 9/45533* (2013.01)

(58) Field of Classification Search
None
See application file for complete search history.

(56) References Cited

U.S. PATENT DOCUMENTS

| 7,716,597 B2 | 5/2010 | Fujii |
| 9,120,022 B2 | 9/2015 | Abe |

(Continued)

FOREIGN PATENT DOCUMENTS

| JP | 2001087559 A | 4/2001 |
| JP | 2002236654 A | 8/2002 |

(Continued)

OTHER PUBLICATIONS

International Search Report for corresponding PCT Application No. PCT/JP2017/005715, 4 pages, dated Apr. 11, 2017.

(Continued)

*Primary Examiner* — Craig C Dorais
(74) *Attorney, Agent, or Firm* — Matthew B. Dernier, Esq.

(57) ABSTRACT

A management server manages an event in which a plurality of users operating different information processing apparatuses share electronic content provided through a network. The management server includes: a communication space control unit that generates a virtual space in which the plurality of users realize communication and that accepts attendance through each information processing apparatus; and an event processing unit that receives an operation of starting to share the electronic content in the virtual space through the information processing apparatus and that carries out a process for starting to share the electronic content.

13 Claims, 20 Drawing Sheets

(56) References Cited

U.S. PATENT DOCUMENTS

| | | | |
|---|---|---|---|
| 9,999,837 B2 | 6/2018 | Kobayashi | |
| 2002/0133542 A1 | 9/2002 | Fujii | |
| 2003/0186744 A1* | 10/2003 | Bradell | G07F 17/32 463/42 |
| 2005/0202875 A1* | 9/2005 | Murphy | A63F 13/12 463/42 |
| 2007/0293293 A1* | 12/2007 | Baerlocher | G07F 17/32 463/16 |
| 2015/0080132 A1 | 3/2015 | Abe | |
| 2016/0082355 A1 | 3/2016 | Kobayashi | |

FOREIGN PATENT DOCUMENTS

| | | |
|---|---|---|
| JP | 2014232459 A | 12/2014 |
| JP | 2014238723 A | 12/2014 |
| JP | 2015054207 A | 3/2015 |

OTHER PUBLICATIONS

International Preliminary Report on Patentability and Written Opinion for corresponding PCT Application No. PCT/JP2017/005715, 14 pages, dated Sep. 7, 2018.
Notification of Reason for Refusal for corresponding Japanese Patent Application No. 2016-032514, 11 pages, dated Oct. 30, 2018.
Extended European Search Report for corresponding EP Application No. 17756347.5 , 7 pages, dated Jun. 17, 2019.

* cited by examiner

EVENT MANAGEMENT SERVER, INFORMATION PROCESSING APPARATUS, INFORMATION PROCESSING SYSTEM, AND EVENT REALIZING METHOD

TECHNICAL FIELD

The present invention relates to a processing technique of electronic content provided by using a network.

BACKGROUND ART

Due to the development of information processing technology, the enhancement of network, and the like of recent years, various types of electronic content, such as games, videos, and electronic books, can be easily enjoyed regardless of the capacity or the use environment of an apparatus, such as a personal computer and a mobile terminal, operated by a user. In addition, a plurality of users at different locations can enjoy the electronic content at the same time or play a game together.

SUMMARY

Technical Problems

To realize a mode in which a plurality of users share one type of electronic content from different locations, a company or the like that provides the electronic content plans an event and invites people interested in attending the event. In this case, the user needs to collect information regarding the event or perform user registration for each company, each type of electronic content, and the like, and the user may feel that the procedure before the actual attendance is cumbersome. In addition, the opening time and the details of the event are often left to the determination of the organization side, and it is difficult to realize a mode that meets various demands of individual attendances.

The present invention has been made in view of the problems, and an object of the present invention is to provide a technique that allows a plurality of users to share electronic content in an excellent environment that meets demands of the users.

Solution to Problems

An aspect of the present invention relates to an event management server. The event management server is an event management server that manages an event in which a plurality of users operating different information processing apparatuses share electronic content provided through a network, the event management server including: a communication space control unit that generates a virtual space in which the plurality of users realize communication and that accepts attendance through each information processing apparatus; and an event processing unit that receives an operation of starting to share the electronic content in the virtual space through the information processing apparatus and that carries out a process for starting to share the electronic content.

Another aspect of the present invention relates to an information processing apparatus. The information processing apparatus is an information processing apparatus operated by each user for attending an event in which a plurality of users share electronic content provided through a network, the information processing apparatus including: a communication control unit that executes a process regarding communication in a virtual space, in which the plurality of users realize the communication, according to an operation of attending the virtual space; and a content sharing start control unit that receives an operation of starting to share the electronic content in the virtual space and that transmits the operation to an event management server managing the event to thereby cause the event management server to carry out a process for starting to share the electronic content.

Yet another aspect of the present invention relates to an information processing system. The information processing system includes: an information processing apparatus operated by each user for attending an event in which a plurality of users share electronic content provided through a network; and an event management server that manages the event, the management server including: a communication space control unit that generates a virtual space in which the plurality of users realize communication and that accepts attendance through each information processing apparatus; and an event processing unit that receives an operation of starting to share the electronic content in the virtual space through the information processing apparatus and that carries out a process for starting to share the electronic content.

Yet another aspect of the present invention relates to an event realization method. The event realization method is executed by a server that manages an event in which a plurality of users operating different information processing apparatuses share electronic content provided through a network, the event realization method including: a step of generating a virtual space in which the plurality of users realize communication and accepting attendance through each information processing apparatus; and a step of receiving an operation of starting to share the electronic content in the virtual space through the information processing apparatus and carrying out a process for starting to share the electronic content.

Note that an arbitrary combination of the constituent elements and a matter obtained by converting the expression of the present invention between a method, an apparatus, a system, a computer program, and the like are also effective as modes of the present invention.

Advantageous Effect of Invention

According to the present invention, a plurality of users can share electronic content in an excellent environment that meets demands of the users.

DESCRIPTION OF EMBODIMENT

Figure 1:
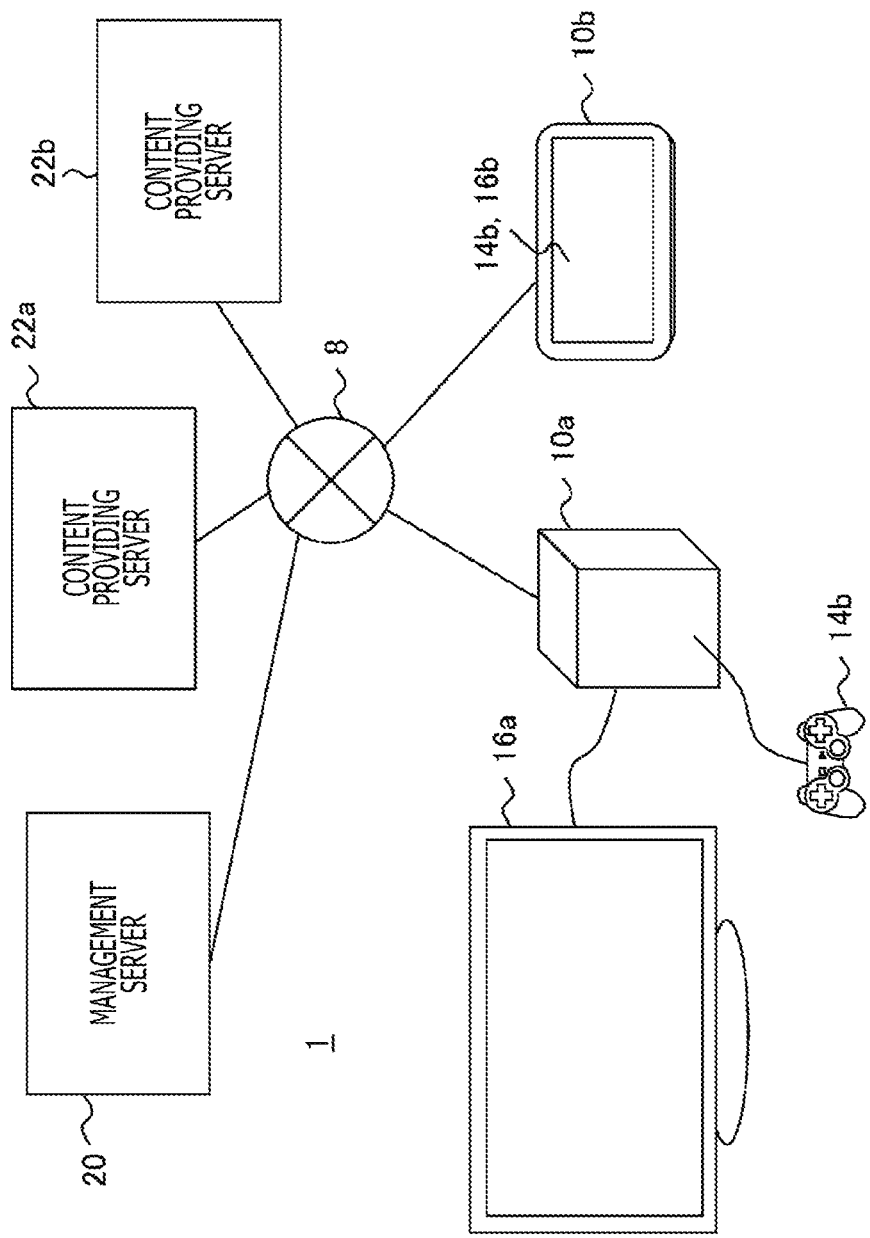
FIG. 1 depicts a configuration example of an information processing system according to a present embodiment.

FIG. 1 illustrates a configuration example of an information processing system according to the present embodiment. An information processing system 1 includes: information processing apparatuses 10a and 10b; and a management server 20 as well as content providing servers 22a and 22b that can communicate with the information processing apparatuses 10a and 10b through a network 8. The information processing apparatuses 10a and 10b are apparatuses operated by users. A display apparatus 16a and an input apparatus 14a may be connected through a wire or wirelessly as in the information processing apparatus 10a, or the apparatus may be integrated with a touch panel (input apparatus 14b and display apparatus 16b) as in the information processing apparatus 10b. Note that the input apparatuses 14a and 14b may include not only a controller and a touch pad as illustrated in FIG. 1, but also a microphone, a camera, and the like.

In addition, the mode of the information processing apparatus is not limited to the illustrated mode. More specifically, the information processing apparatuses 10a and 10b may be realized by any general apparatuses, such as game devices, personal computers, tablet terminals, mobile terminals, and mobile phones. The number of information processing apparatuses 10a and 10b connected to the network 8 is not particularly limited. Hereinafter, the information processing apparatuses 10a and 10b may be collectively referred to as an information processing apparatus 10, the input apparatuses 14a and 14b may be collectively referred to as an input apparatus 14, and the display apparatuses 16a and 16b may be collectively referred to as a display apparatus 16. The content providing servers 22a and 22b provide electronic content to the information processing apparatus 10 through the network 8. In the present embodiment, electronic data is particularly provided at the same period to a plurality of information processing apparatuses 10 accessed through the network 8, and a plurality of users share the experience regarding the electronic content.

In that sense, the details of the electronic content provided by the content providing servers 22a and 22b are not particularly limited. For example, a game provided by a game production company or the like can be played by a plurality of players, or a video can be distributed through live streaming. Therefore, each of the content providing servers 22a and 22b is managed by various organizations, such as a game production company, a licensee, and a video distribution company, and the number of content providing servers 22a and 22b is not limited. Hereinafter, the content providing servers 22a and 22b will be collectively referred to as a content providing server 22.

In this way, an opportunity of a plurality of users sharing the experience regarding the electronic content will be referred to as an "event." In the present embodiment, a user operating one of the information processing apparatuses 10 can plan an event. The management server 20 receives and manages the plan of the event from the information processing apparatus 10. The management server 20 or other means announces the planned event to the other users or communities. Hereinafter, the process of transmitting event information for the announcement will be referred to as "invitation."

In a case where the user recognizing the plan of the event through the announcement performs an operation of displaying the details of the event on the information processing apparatus 10, the management server 20 provides detailed information as necessary. Then, when the user registers for attendance, the management server 20 receives the registration and issues a notification or the like to the information processing apparatus 10 at the start of the event or the like depending on the setting.

Prior to the start of sharing of the electronic content in the event, the management server 20 further sets up a space on the network where the attendances can gather. Here, the space on the network is a virtual space that can be accessed through a network and that is displayed as if the user accessing the space on a display image exists there. The space is widely used in online communication, online games, and the like. The attendances entering the space can then talk to each other or can manage the timing for starting to share the electronic content according to the situation of gathering or the attending members. The electronic content to be shared may be determined, or the members that share the electronic content may be adjusted according to the direction of conversation, the number of people gathered, or the like.

The space on the network that allows this may be set up as part of the event planned by, for example, the user setting the start time in advance as described above, or the user may be able to freely enter and exit the space or construct the space at an arbitrary timing as in conventional SNS (social networking service). In the latter case, the event for sharing the electronic content can be immediately held as a result of communication between the users in the space.

In any case, when the electronic content to be shared and the sharing members are finally determined in the space on the network, the information processing apparatus 10 of one of the sharing members receives an operation of shifting to a sharing phase of the electronic content. In response, the management server 20 carries out a procedure for sharing the electronic content such as transmitting an ID (identifier) of a session with the content providing server 22 to the information processing apparatuses 10 of the other sharing members. As a result, communication is established between the content providing server 22 and the information processing apparatuses 10 of the sharing members, and the sharing of the electronic content is started.

Such a configuration realizes a seamless shift from the space for the communication generated by the management server 20 reflecting the intention of the users (hereinafter, referred to as "communication space") to the game space provided by the content providing server 22. As a result, the preference or the convenience of each user can be immediately and easily reflected on the electronic content providing service in which the schedule or the details tend to be one-way, and the service can be more flexibly used. Furthermore, the users can enter the world of electronic content together, while the atmosphere or the excitement of the communication between the users is maintained.

Figure 2:
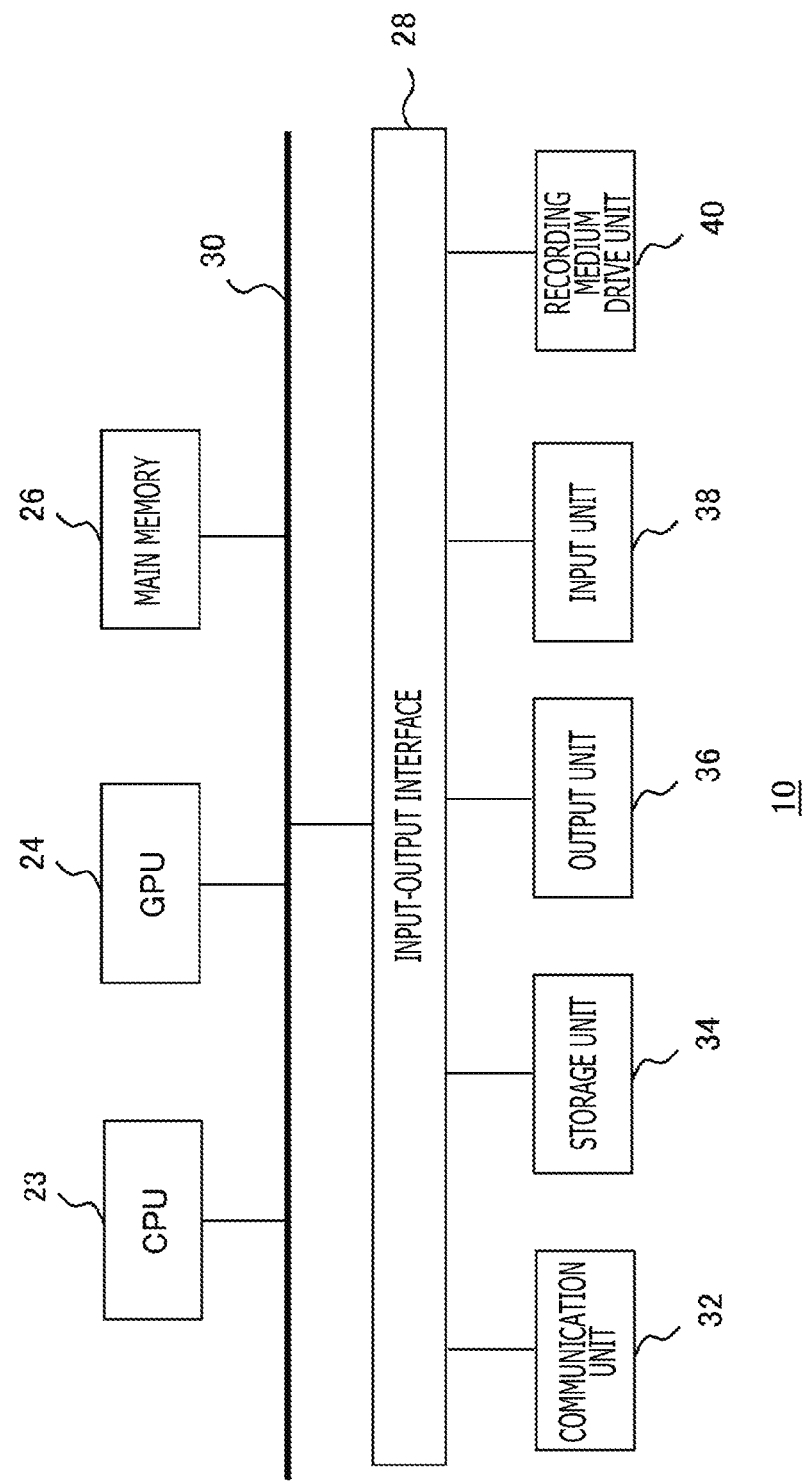
FIG. 2 depicts an internal circuit configuration of an information processing apparatus according to the present embodiment.

FIG. 2 illustrates an internal circuit configuration of the information processing apparatus 10. The information processing apparatus 10 includes a CPU (central processing unit) 23, a GPU (graphics processing unit) 24, and a main memory 26. These components are connected to each other through a bus 30. An input-output interface 28 is further connected to the bus 30. Components connected to the input-output interface 28 include: a communication unit 32 including a peripheral device interface, such as USB (Universal Serial Bus) and IEEE (Institute of Electrical and Electronics Engineers, Inc.) 1394, and a network interface of wired or wireless LAN (local area network); a storage unit 34, such as a hard disk drive and a non-volatile memory; an output unit 36 that outputs data to the display apparatus 16; an input unit 38 that receives data from the input apparatus 14; and a recording medium drive unit 40 that drives a removable recording medium, such as a magnetic disk, an optical disk, and a semiconductor memory.

The CPU 23 executes an operating system stored in the storage unit 34 to control the entire information processing apparatus 10. The CPU 23 also executes various programs read from the removable recording medium and loaded on the main memory 26 or various programs downloaded through the communication unit 32. The communication unit 32 also establishes communication with the management server 20 and the content providing server 22 to acquire various data necessary for internal processing or transmit data indicating the details input by the user.

The GPU 24 has a function of a geometry engine and a function of a rendering processor. The GPU 24 executes a drawing process according to a drawing command from the CPU 23 and stores a display image in a frame buffer not illustrated. The GPU 24 then converts the display image stored in the frame buffer into a video signal and outputs the video signal to the output unit 36. The main memory 26 includes a RAM (random access memory) and stores programs and data necessary for processing. Note that internal circuit configurations of the management server 20 and the content providing server 22 may also be similar.

Figure 3:
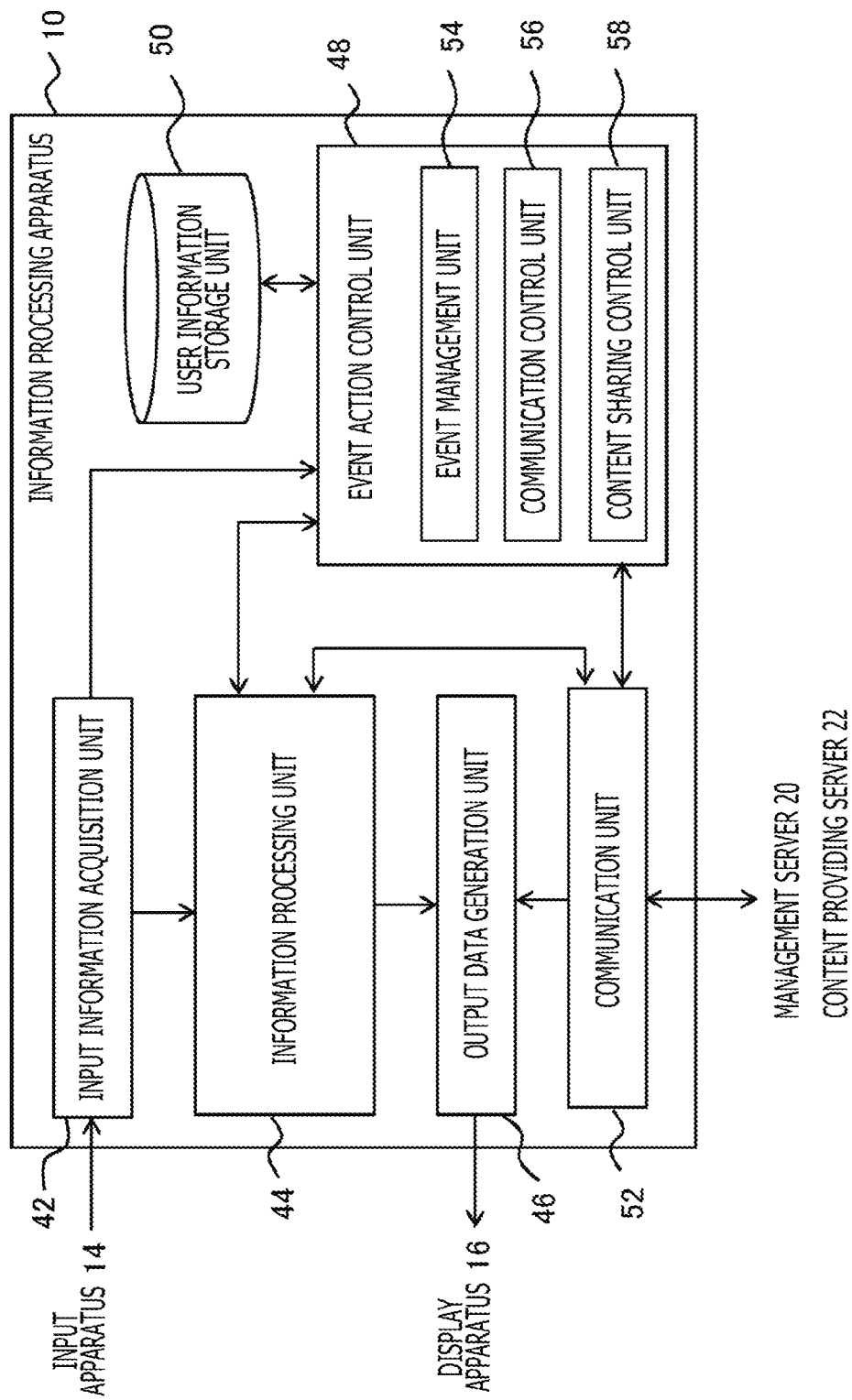
FIG. 3 depicts a configuration of the information processing apparatus according to the present embodiment.

FIG. 3 illustrates a configuration of functional blocks of the information processing apparatus 10. Elements described as functional blocks that execute various processes in FIG. 3 and in FIGS. 4 and 5 described later can include CPUs, GPUs, main memories, and other LSIs (large scale integrations) in terms of hardware as already described above, and the elements are realized by programs stored in a recording medium or a storage device and loaded on a memory in terms of software. Therefore, those skilled in the art will appreciate that the functional blocks can be realized in various forms using only hardware, only software, or a combination of hardware and software, and the form is not limited to any of these.

The information processing apparatus 10 includes: an input information acquisition unit 42 that receives a user operation through the input apparatus 14; an information processing unit 44 that carries out information processing according to details of the received operation; an event action control unit 48 that controls an action regarding the event; an output data generation unit 46 that generates data of an image or sound to be output; a communication unit 52 that establishes communication with the management server 20 and the content providing server 22 to transmit and receive data; and a user information storage unit 50 that stores various types of information regarding the user that operates the information processing apparatus 10.

The input information acquisition unit 42 acquires, from the input apparatus 14, a signal indicating the details of the operation performed by the user, such as an input regarding the planning of the event or the attendance registration, an input of a speech or various commands in the communication space, and an operation input for the electronic content such as a game. The information processing unit 44 carries out necessary information processing based on the details of the operation of the user acquired by the input information acquisition unit 42 or the data transmitted from one of the management server 20 and the content providing server 22.

Specifically, the information processing unit 44 executes a process or the like necessary on the information processing apparatus 10 side to control the display of information regarding the event, receive the registration, display the communication space, or progress the shared electronic content. The information processing unit 44 may also appropriately execute information processing of a game or the like in which the process is completed inside of the information processing apparatus 10.

The event action control unit 48 includes an event management unit 54, a communication control unit 56, and a content sharing control unit 58 and manages and controls processes necessary for the planning or the execution of the event among the processes executed by the information processing unit 44. More specifically, the event action control unit 48 requests the information processing unit 44 for a process based on the data transmitted from the management server 20 or the content providing server 22 or acquires data necessary for the execution of the event from the information processing unit 44 to issue transmission data for the management server 20 or the content providing server 22.

The event management unit 54 acquires, from the information processing unit 44, the details of the planning of the event input by the user and transmits the details to the management server 20. The event management unit 54 also requests the information processing unit 44 for a process of acquiring information of events planned by other users, events registered for attendance, or the like from the management server 20 and appropriately displaying the information. The event management unit 54 further requests the information processing unit 44 to start a process regarding the communication space for the event at the start time of the event registered for attendance. In a preliminary stage of the request, the event management unit 54 requests the information processing unit 44 for a process of indicating that the event start time is approaching in a case where the information processing unit 44 is executing other information processing, or the event management unit 54 restores the processing function in a case where the information processing unit 44 is in a standby state (sleep state) in which the processing function is stopped.

When an operation regarding the event is input in the communication space processed by the information processing unit 44, the communication control unit 56 acquires the information of the operation from the information processing unit 44 and transmits the information to the management server 20. Specifically, the communication control unit 56 acquires and transmits the details of the operation, such as invitation for a new user or community, selection of electronic content to be shared, selection of sharing members, and shift to electronic content sharing phase.

Note that the entity of the "community" of the invitee is not particularly limited as long as the community denotes a set or organization of a plurality of users. For example, the community may be an assembly of users attending a virtual space formed on a network as in a text chat or a voice chat, may be the virtual space, or may be other dynamic communities. The community may be a relatively stationary one, such as an assembly of users registered as members in an organization and an assembly of users associated with a common target on a network. In any case, if a place that can be accessed by the users belonging to the assembly exists on the network, the place can be designated as an invitee.

When there is a shift to the electronic content sharing phase, the content sharing control unit 58 requests the management server 20 for a necessary process or acquires necessary information from the management server 20 in order to realize the sharing of the electronic content by the users gathered in the communication space or by selected members. The content sharing control unit 58 then acquires a start point of the electronic content, input information of other users, and the like from the content providing server 22 in the electronic content sharing phase and supplies them to the information processing unit 44.

The content sharing control unit 58 also acquires the information input by the user operating the information processing apparatus 10 from the input information acquisition unit 42 or the information processing unit 44 and issues the input information to the content providing server 22. In this way, each information processing apparatus 10 handles the details of the operations of a plurality of users as input information to progress the information processing to thereby attain the sharing of the electronic content, such as a plurality of players playing one game.

Although the execution of an electronic game by the plurality of players is depicted as the sharing of the electronic content in the following description, the electronic content is not limited to the game as described above. The electronic content may be distribution of video or sound, may be an input of a comment for the video or the sound, or may be an appropriate combination of these. Those skilled in the art will appreciate that there can be various methods of sharing the electronic content, and a practically used technique can be applied. Therefore, the planning or registration of the event, the construction of the communication space, and the process of shifting to the electronic content sharing phase will be mainly described below.

The output data generation unit 46 generates data of an image or sound to be output as a result of the information processing executed by the information processing unit 44 and causes the display apparatus 16, a speaker not illustrated, or the like to output the data. In a case where the shared electronic content is in a format of displaying stream data transmitted from the content providing server 22 on the display apparatus, the output data generation unit 46 may directly decode the stream data and output the stream data to the display apparatus 16.

The user information storage unit 50 stores identification information of the user using the information processing apparatus 10 in association with related events, such as an event planned by the user, an invited event, an event registered for attendance, and an attended event. Managing the events for each user can provide information of the events corresponding to the logged-in users even in a case where a plurality of users use one information processing apparatus 10. In addition, a new event can be efficiently planned by allowing the user to reference the events planned or attended in the past.

Furthermore, when the start time of the event is approaching, the event management unit 54 can reference the corresponding information to determine whether the user logged in at that point is the same as the user registered for attendance, and details of notification or subsequent processing is switched according to the result. For example, in a case where another user is logging in, the name of the user registered for attendance may be presented to prompt the user to log in, and in a case where the user registered for attendance does not log in, the process for the event may not be started.

The communication unit 52 is an interface that establishes communication with the management server 20 and the content providing server 22 to transmit and receive necessary data according to the request by the information processing unit 44, the event action control unit 48, or the like.

Figure 4:
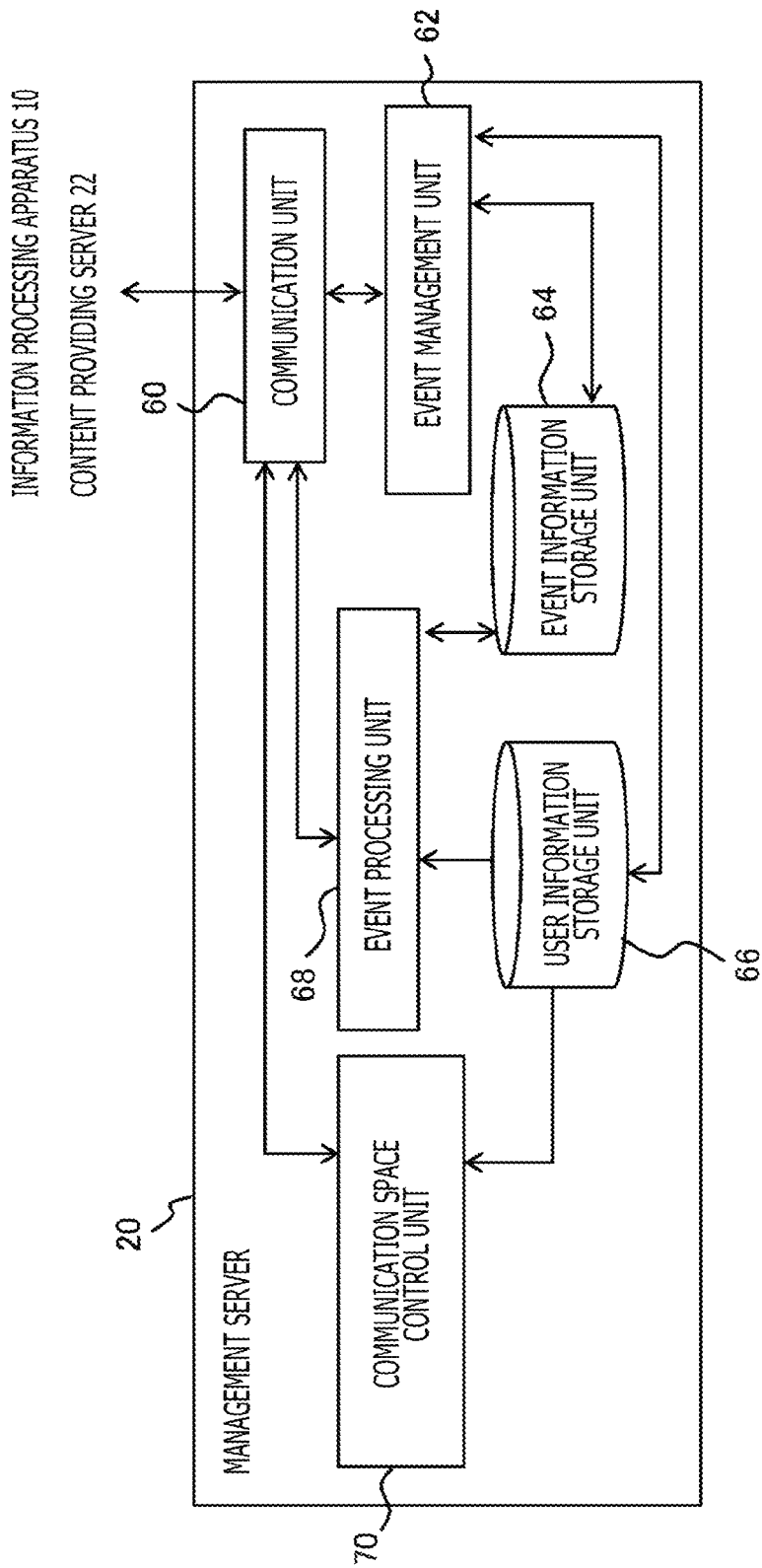
FIG. 4 depicts a configuration of a management server according to the present embodiment.

FIG. 4 illustrates a configuration of functional blocks of the management server 20. The management server 20 includes: an event management unit 62 that manages event information; an event information storage unit 64 that stores the event information; a user information storage unit 66 that stores information associated with the event and the like related to the user; an event processing unit 68 that executes a process necessary for the execution of the event; a communication space control unit 70 that constructs the communication space; and a communication unit 60 that establishes communication with the information processing apparatus 10 and the content providing server 22 to transmit and receive data.

The event management unit 62 acquires the details of the planning of the event from the information processing apparatus 10 used by the user to input the plan and stores the details in the event information storage unit 64. The details of the planning can include the start time of the event, the details of the event, the target game, and other users or community names to be invited, and part of the details may not be included. The event management unit 62 further acquires information of the registration for attendance by users recognizing the planning of the event, that is, invited users, from the information processing apparatus 10 used by each user.

The event management unit 62 then stores the identification information of the user planning the event, the users invited to the event, and the users invited and registered for attendance in the user information storage unit 66 in association with the identification information of the event. Identification information of the information processing apparatus 10 to be used, the users registered as friends, the attending community, and the like is also stored in advance in the user information storage unit 66 in association with the identification information of each user.

The event management unit 62 also reads, from the event information storage unit 64, the information of the event to be applied with display processing by the information processing apparatus 10 and transmits the information to the information processing apparatus 10. For example, when the user invited to the planned event performs an operation of displaying the details of the event in the information processing apparatus 10, the event management unit 62 acquires a notification of the operation and transmits the information of the event. In addition, the event management unit 62 also transmits data to display information of an event registered for attendance by the user, an event attended in the past, and the like according to a request by the user. In this case, the event management unit 62 specifies the event corresponding to designated conditions based on the information stored in the user information storage unit 66.

When an individual user is designated as an invitee of a newly planned event, the event processing unit 68 references the user information storage unit 66 and notifies the information processing apparatus 10 used by the user of the invitation. The identification information of the user is included in the notification, and the invitation is displayed while the user is logging in the information processing apparatus 10. The event processing unit 68 also notifies the user registered for attendance that the start time of the event is approaching, the event is started, or the like at a predetermined timing based on the start time of the event registered for attendance. For example, at the time of the attendance registration, the event processing unit 68 notifies the information processing apparatus 10 of processes to be executed before and after the start of the event and causes the information processing apparatus 10 to set a timer.

In this way, even when the information processing apparatus 10 or the display apparatus 16 is in the sleep state, the functions can be automatically recovered to display and notify the user that the event is to be started. Other than the setting of the timer, the event may be set as one of the schedules in a calendar that can be displayed by the information processing apparatus 10 as necessary to allow the user to view the schedule, or a notification function included in the calendar may be used for the notification.

Note that the target to be viewed in the calendar or the target of the notification of the start time may not be limited to the event planned by the user. For example, an official event or the like planned by a company holding the content providing server 22 may be similarly displayed in the calendar according to the attendance registration of the user, and the notification indicating that the start time has come may be similarly issued. In any case, in a case where the start time of the event or the situation of the attendance registration is changed, the event processing unit 68 updates the details of the setting in the information processing apparatus 10.

The event management unit 62 reads latest information regarding the start time of the event and the situation of the attendance registration stored in the event information storage unit 64 and the user information storage unit 66. Note that in a system that clearly maintains periodical or continuous network connection through the information processing apparatus 10, a request for executing a process of displaying the time of notification may be transmitted to the information processing apparatus 10 at the time of notification, instead of setting the timer in advance. In any case, notifying that the start time of the event registered for attendance is approaching in the information processing apparatus 10 can reduce the possibility of not attending the event due to forgetting.

The event processing unit 68 further transmits a session ID of the communication space to the information processing apparatuses 10 of the attendances of the event and specifies the corresponding content providing servers 22 in the sharing phase of the electronic content to execute a process for appropriate communication between the information processing apparatuses 10 of the sharing members and the content providing servers 22.

The communication space control unit 70 provides a communication space that realizes communication between a plurality of users using different information processing apparatuses 10. Specifically, the communication space control unit 70 realizes a mechanism that can immediately output speeches of each user to the information processing apparatuses 10 of all members as in a general text chat, voice chat, video chat, or electronic bulletin board. A practically used general technique can be applied to the process for the communication. Whereas, an operation of shifting to the electronic content sharing phase can be performed in the communication space in the present embodiment as described above.

Furthermore, the communication space control unit 70 also allows operations of determining the electronic content to be shared and selecting the sharing members. The communication space control unit 70 provides a GUI (graphical user interface) or the like for receiving the operation in the communication space. When the GUI is selected and operated, the event processing unit 68 receives the operation and reflects the operation on subsequent processing. As described above, there is a case where the communication space provided by the communication space control unit 70 is set up as part of the event, and there is a case where the event is generated in the communication space after the communication space is initially set up independently of the event.

In the latter case, a space similar to a general SNS can be provided when an operation for generating the event is not performed. Therefore, the communication space control unit 70 may generate some virtual spaces to provide the communication service. Then, when one of the communities is designated as an invitee of a newly planned event, the communication space control unit 70 displays the information of the event in the corresponding virtual space in a format of a speech of an event planner or the like. At the same time, the GUI for displaying the details of the event can be provided to separately display the detailed information under the control of the event management unit 62.

Note that in the case of generating the event in the communication space, the operation of generating the event and the input of the details of the planning of the event are performed in the information processing apparatus 10, and then the information is transmitted to the management server 20. The subsequent process by the event management unit 62 is similar to the process described above. In this case, among the functions of the event processing unit 68, the function of notifying the user and the function of automatic activation at the start of the event can be eliminated. Even in the mode of planning the event in advance, the user may configure the setting not to perform the automatic activation or notification.

Figure 5:
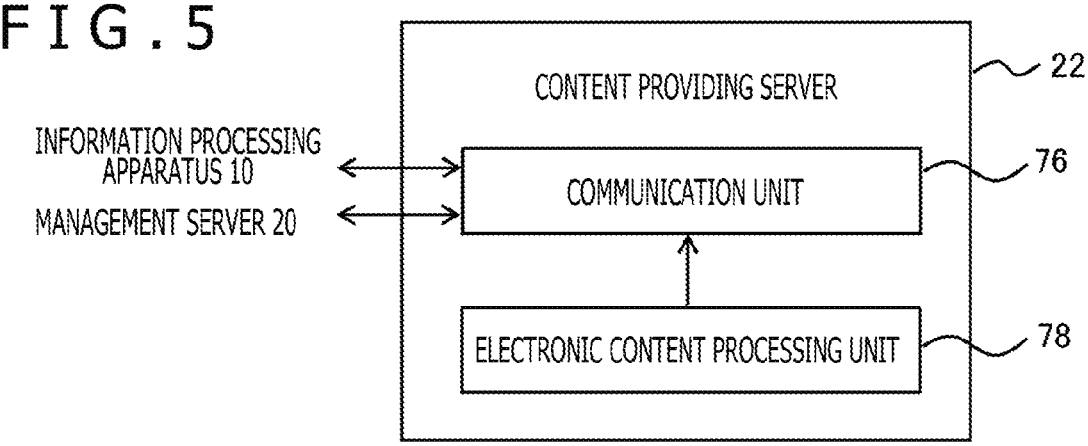
FIG. 5 depicts a configuration of functional blocks of a content providing server according to the present embodiment.

FIG. 5 illustrates a configuration of functional blocks of the content providing server 22. The content providing server 22 includes: an electronic content processing unit 78 that processes electronic content; and a communication unit 76 that establishes communication with the information processing apparatus 10 and the management server 20 to transmit and receive data. The electronic content processing unit 78 transmits electronic data necessary for sharing the electronic content to the information processing apparatuses 10 used by the sharing members through the communication unit 76. Various data can be provided as described above, and for example, screen data of an online game, stream data of a video, operation input information of each user, and other general data may be provided. Furthermore, the data may be a special processing program prepared for the event, control parameters, or the like.

The communication unit 76 establishes communication with the information processing apparatuses 10 of the sharing members to realize transmission and reception of the data. In this case, the management server 20 performs control to conduct the communication appropriately by, for example, transmitting invitations for sharing the electronic content to the information processing apparatuses 10 of the sharing members. For example, the management server 20 acquires the session ID from the content providing server 22 to allow the content providing server 22 and the plurality of information processing apparatuses 10 to enter the same session and issues notifications to the information processing apparatuses 10 to enter the session.

Figure 6:
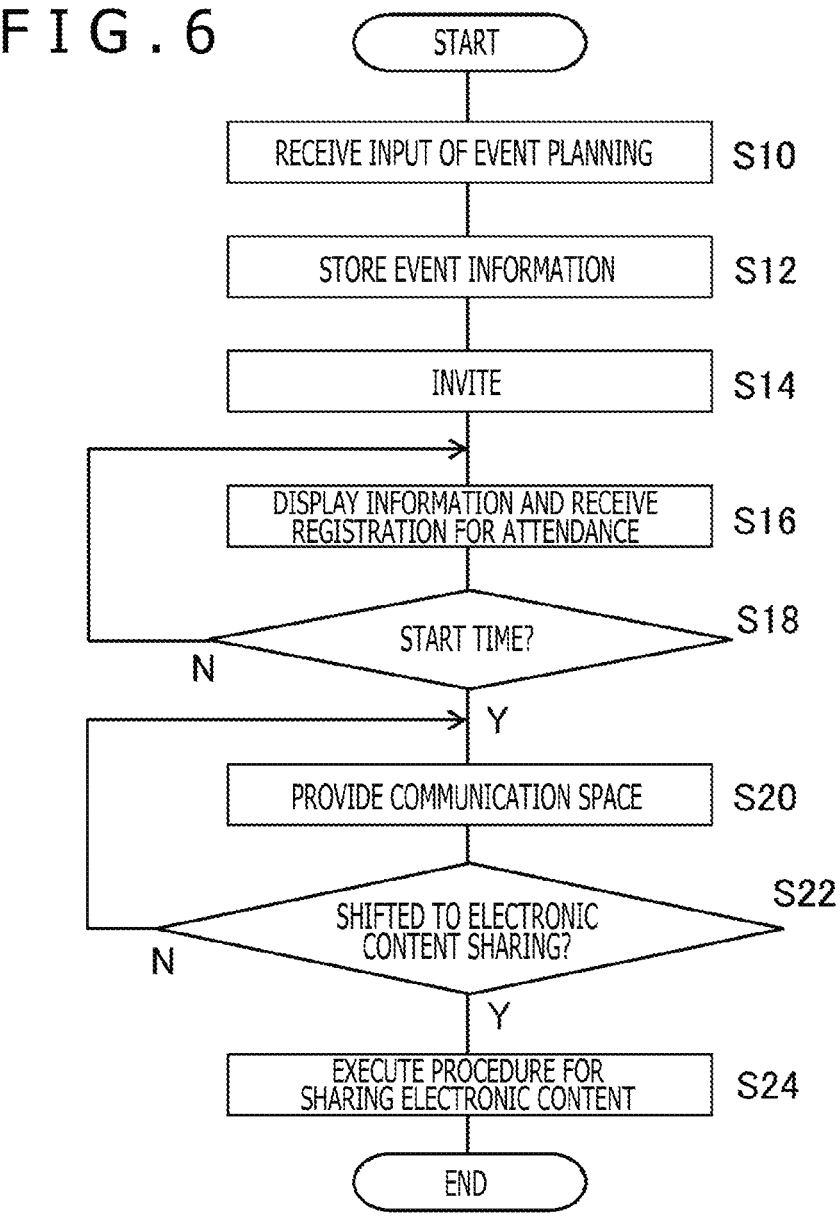
FIG. 6 is a flow chart illustrating a summary of a processing procedure carried out by the management server in a case of generating a communication space based on an event planned in advance according to the present embodiment.

Next, an action of the management server 20 realized by the configuration will be described. FIG. 6 is a flow chart illustrating a summary of a processing procedure carried out by the management server 20 from the event planning to the start of sharing of the electronic content in a case of generating a communication space in an event planned in advance. First, when the information processing apparatus 10 displays an event creation screen, and the user inputs details of planning of a new event on the event creation screen, the event management unit 62 of the management server 20 receives the information (S10) to update the information stored in the event information storage unit 64 or stored in the user information storage unit 66 (S12).

Subsequently, the user information storage unit 66 and the communication space control unit 70 display an invitation to the event in the information processing apparatus 10 of a user designated as an invitee of the planned event and in the communication space (S14). When the user viewing the invitation performs an operation of displaying the details of the event or registers for attending the event, the event management unit 62 receives the operation or the registration (S16). Specifically, when the user performs an operation for displaying the details, the event management unit 62 transmits the data of the detailed information of the event to the information processing apparatus 10. When the user registers for attendance, the event management unit 62 updates the information stored in the user information storage unit 66.

The event processing unit 68 monitors the time period before the start of the event and allows to display the detailed information of the event and register for attendance until the start of the event (N in S18, S16). When the start time comes, the communication space control unit 70 starts to provide the communication space for the event (S20). Note that depending on the setting, the information processing apparatus 10 may be controlled to notify the user at the predetermined timing before the start time as described above.

In addition, the generation process of the communication space may be executed at the point that one of the users registered for attendance including the planner performs an operation of entering the communication space first or may be automatically executed at the start time. As described above, the mechanism of a conventional SNS or the like may be applied to construct the communication space. Meanwhile, it is only necessary that the space be a space for constructing a set of users attending to share the electronic content, and the space may not be a place for communication in a strict sense. The configuration may be simpler, such as simply indicating only icons of the users entering the same session.

Therefore, the mechanism and the details of display of the space provided in S20 are not particularly limited as long as the situations of the users can be mutually checked in real time. However, by making a shift to the sharing phase of the electronic content through a conversation in real time, the users can understand each other and check the detailed situations, and the timing of the shift and the electronic content to be shared can be favorably adjusted. The users mutually check the situations in this way until there is an operation of shifting to the electronic content sharing phase (N in S22, S20).

If a shifting operation is performed (Y in S22), the event processing unit 68 carries out a necessary procedure to appropriately start communication between the content providing server 22 providing the target electronic content and the information processing apparatuses 10 of the sharing members (S24). In response, each information processing apparatus 10 accesses the content providing server 22 to share the electronic content.

Note that the users registered for attending the event and the users actually attending the communication space may not always match, such as when a user registered for attendance withholds attending the event due to a personal reason. In view of this, the members sharing the electronic content are basically the users in the communication space at the time of the operation of shifting to the sharing phase. A function of sending invitations to designated users or other communities may also be set in the communication space provided in step S20 in order to gather more members. Conversely, to handle a case in which there are too many members in the communication space, and the number of members exceeds an upper limit of the number of users that can share the electronic content, a function of selecting the sharing members is set as described above.

Figure 7:
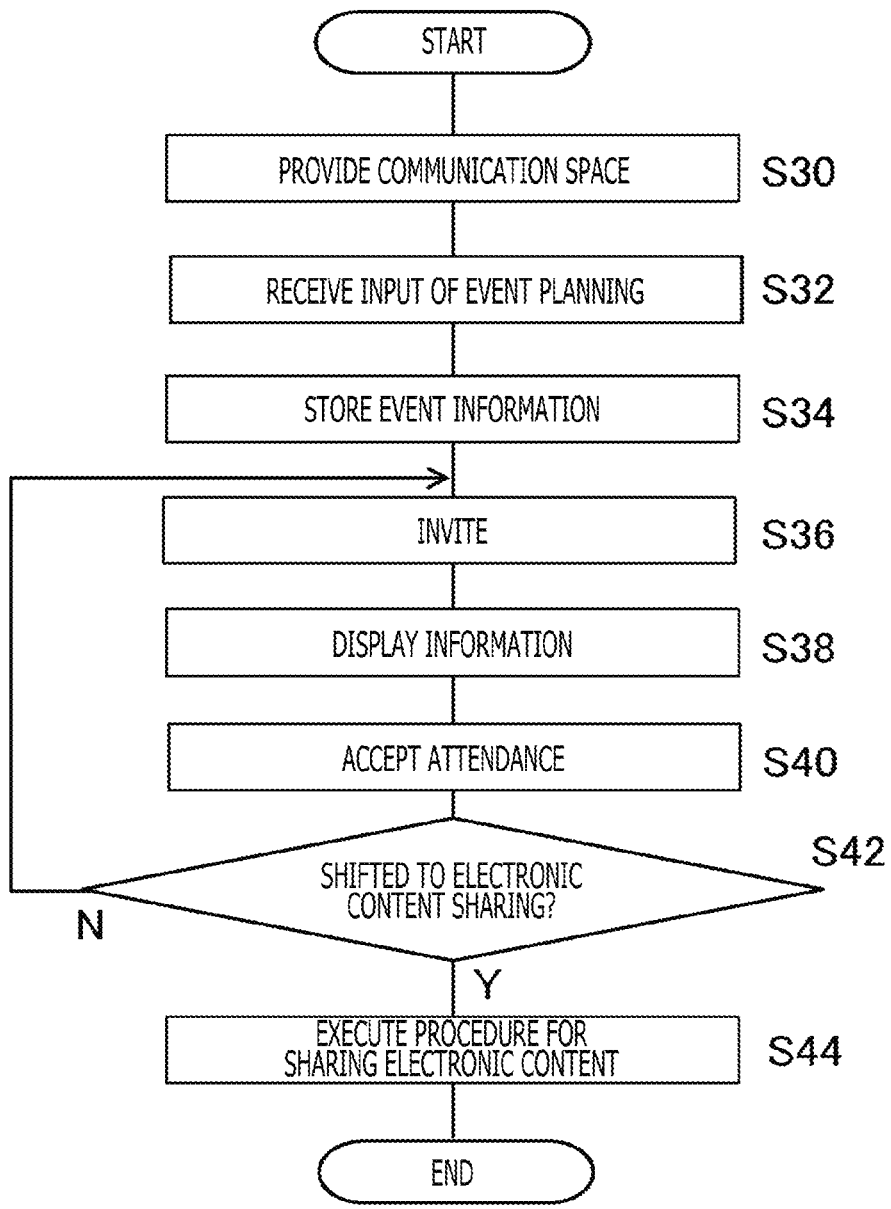
FIG. 7 is a flow chart illustrating a summary of a processing procedure carried out by the management server in a case of generating an event in the communication space according to the present embodiment.

FIG. 7 is a flow chart illustrating a summary of a processing procedure carried out by the management server 20 before the start of sharing of the electronic content in the case of generating the event in the communication space. First, the communication space control unit 70 generates a communication space as necessary according to the user operation (S30). The communication space may be formed all the time such as in a case of a web page. Then, when the user entering the communication space performs an operation of generating an event and inputs details of a plan, the event management unit 62 of the management server 20 receives the information (S32). The event management unit 62 stores the information in the event information storage unit 64 or updates the information stored in the user information storage unit 66 (S34).

In this case, based on the members gathered in the communication space, a user in the communication space performs an operation of inviting a new user in a case of further increasing the members. Consequently, the user information storage unit 66 and the communication space control unit 70 display the invitation to the event on the information processing apparatus 10 of the user designated as the invitee or in the communication space (S36). When the user viewing the invitation performs an operation of displaying the details of the event, the event management unit 62 transmits and displays the data of the detailed information of the event on the information processing apparatus 10 (S38).

When the user viewing the invitation registers for attendance, the communication space control unit 70 receives the registration and executes a process of setting the user as a member of the communication space (S40). Note that the process of S36 to S40 is skipped in a case where the member does not have to be increased. Until there is an operation of shifting to the electronic content sharing phase, the users can mutually check the situations or recruit members (N in S42, S36 to S40). If the shifting operation is performed (Y in S42), the event processing unit 68 carries out a necessary procedure to appropriately start the communication between the content providing server 22 providing the target electronic content and the information processing apparatuses 10 of the sharing members (S44).

Figure 8:
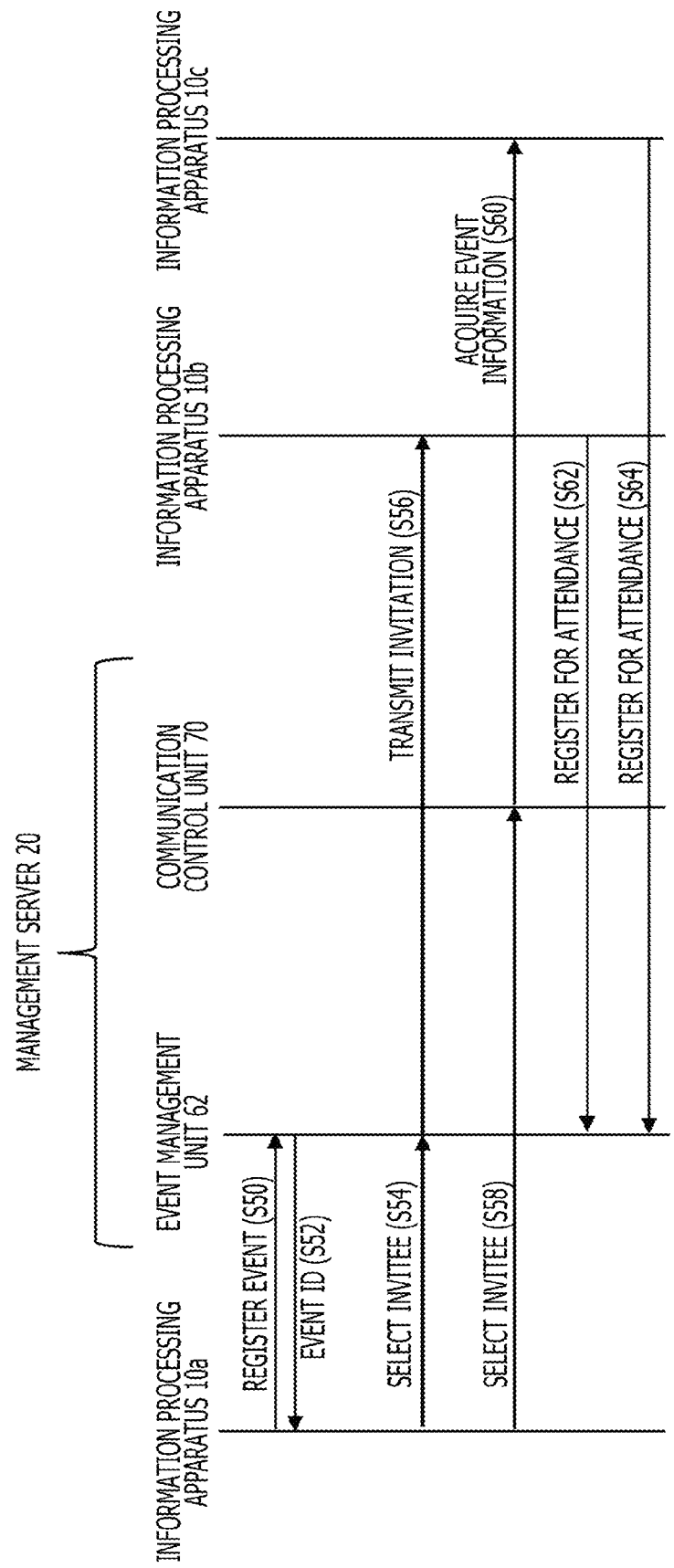
FIG. 8 is a time chart illustrating transmission and reception of data between the information processing apparatus and the management server at a stage of the event planning and attendance registration in advance according to the present embodiment.

FIG. 8 is a time chart illustrating transmission and reception of data between the information processing apparatuses 10 and the management server 20 in a preliminary stage of event planning and attendance registration. Although a plurality of information processing apparatuses will be distinguished as information processing apparatuses 10a, 10b, and 10c, and the like in FIG. 8 and FIGS. 9 to 11 described later, the roles of the information processing apparatuses are subject to change, and the same reference signs may not always indicate common information processing apparatuses across a plurality of drawings. First, when the user planning the event performs a registration operation by, for example, inputting the details of the plan to the event planning input screen in the information processing apparatus 10a operated by the user, the details of the plan are transmitted to the management server 20 (S50).

Consequently, the event management unit 62 of the management server 20 provides identification information (referred to as "event ID") to the event and returns the event ID to the information processing apparatus 10a of the registration source (S52). At this point, the event management unit 62 stores the information regarding the details of the event in the event information storage unit 64 in association with the event ID. The event is recognized based on the event ID in subsequent data transmission and reception and various processes. When the user designates a user or a community to be invited to the planned event in the information processing apparatus 10a, the information processing apparatus 10a transmits the information of the invitee to the management server 20 in association with the event ID (S54, S58).

The event processing unit 68 of the management server 20 specifies the identification information of the information processing apparatus 10b used by the designated user and transmits an invitation including the event ID, the identification information of the user, the summary of the event, and the like to the information processing apparatus 10b (S56). The communication space control unit 70 of the management server 20 specifies the communication space corresponding to the designated community and displays the summary of the event in the communication space (S58). The invitation is recognized by the user using the information processing apparatus 10c to access the communication space (S60).

When the users recognizing the invitations through the direct notification or in the communication space register for attendance in the respective information processing apparatuses 10b and 10c, the information processing apparatuses 10b and 10c associate the identification information of the users and the event ID and transmit notifications indicating the attendance registration to the management server 20 (S62, S64). The event management unit 62 associates each user and the event registered for attendance in the user information storage unit 66. Although not illustrated, in the case where the information processing apparatuses 10a, 10b, and 10c perform operations of displaying the detailed information of the event, the event management unit 62 transmits the detailed information to the apparatuses as necessary.

Figure 9:
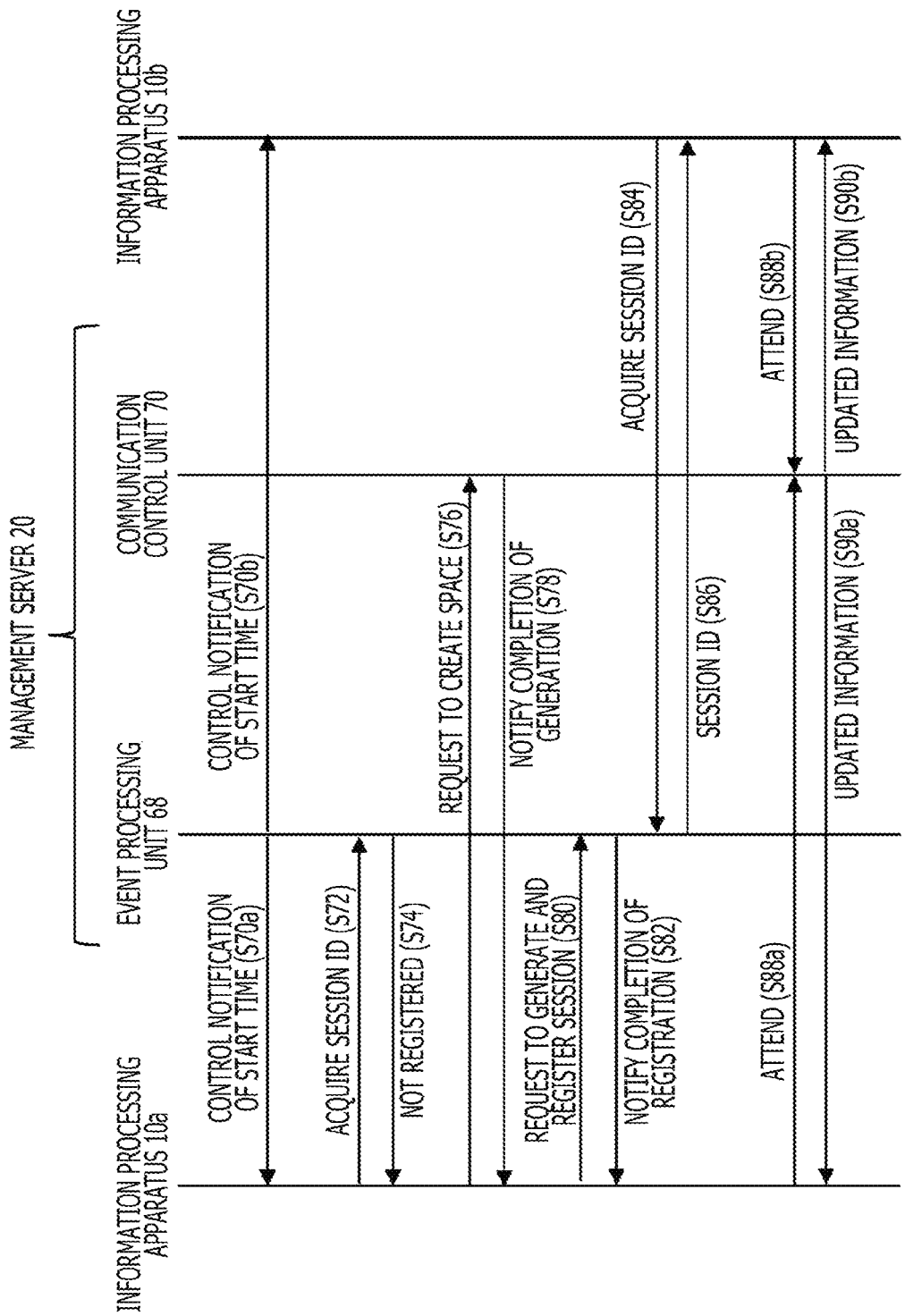
FIG. 9 is a time chart illustrating transmission and reception of data between the information processing apparatus and the management server at a stage of the start of the event according to the present embodiment.

FIG. 9 is a time chart illustrating transmission and reception of data between the information processing apparatuses 10 and the management server 20 at the start of the event. First, the event processing unit 68 of the management server 20 refers to the user information storage unit 66 to control the information processing apparatuses 10a and 10b used by the user planning the event and the user registered for attendance to notify that the start time is approaching or has come (S70a, S70b). For the process, the timer may be set in advance, or the processing request may be directly issued at the stage of the notification as described above.

Accordingly, the information processing apparatuses 10a and 10b carry out a display process of the notification. The information processing apparatus (information processing apparatus 10a in FIG. 9) used by the user that has first performed the operation of attending the event among the users viewing the notification tries to acquire the session ID for entering the communication space for the event (S72). Although the event processing unit 68 of the management server 20 receives the attempt, the communication space of the event is not generated at this point, and an instruction indicating that the session is not registered is returned (S74).

In response, when the information processing apparatus 10a requests for the generation of the communication space for the event, the communication space control unit 70 of the management server 20 receives the request and generates the communication space (S76). The communication space control unit 70 then returns a notification indicating the completion of the generation to the information processing apparatus 10a along with the identification information of the communication space (S78). When the information processing apparatus 10a receiving the notification requests for the generation and the registration of the session along with the event ID and the identification information of the communication space, the event processing unit 68 of the management server 20 receives the request (S80).

The event processing unit 68 then generates the session, registers the session in association with the event ID and the identification information of the communication space, and returns a notification indicating the completion of the registration to the information processing apparatus 10*a* along with the session ID (S82). Subsequently, when another information processing apparatus (information processing apparatus 10*b* in FIG. 9) tries to acquire the session ID for entering the communication space for the event, the event processing unit 68 of the management server 20 receives the attempt (S84). At this point, since the communication space corresponding to the event is already generated, the event processing unit 68 returns the session ID and the identification information of the communication space to the information processing apparatus 10*b* (S86).

As a result of the procedures, the corresponding communication space is generated along with the start of the event, and each of the information processing apparatuses 10*a* and 10*b* can access the communication space. Each user then attends the communication space through the information processing apparatus 10*a* or 10*b* of the user (S88*a*, S88*b*) and receives updated information such as speeches of other users (S90*a*, S90*b*) to realize communication between the users. Note that the detailed processes for newly generating the communication space and attending there are not limited to the illustrated processes, and practically used techniques may be appropriately used.

Figure 10:
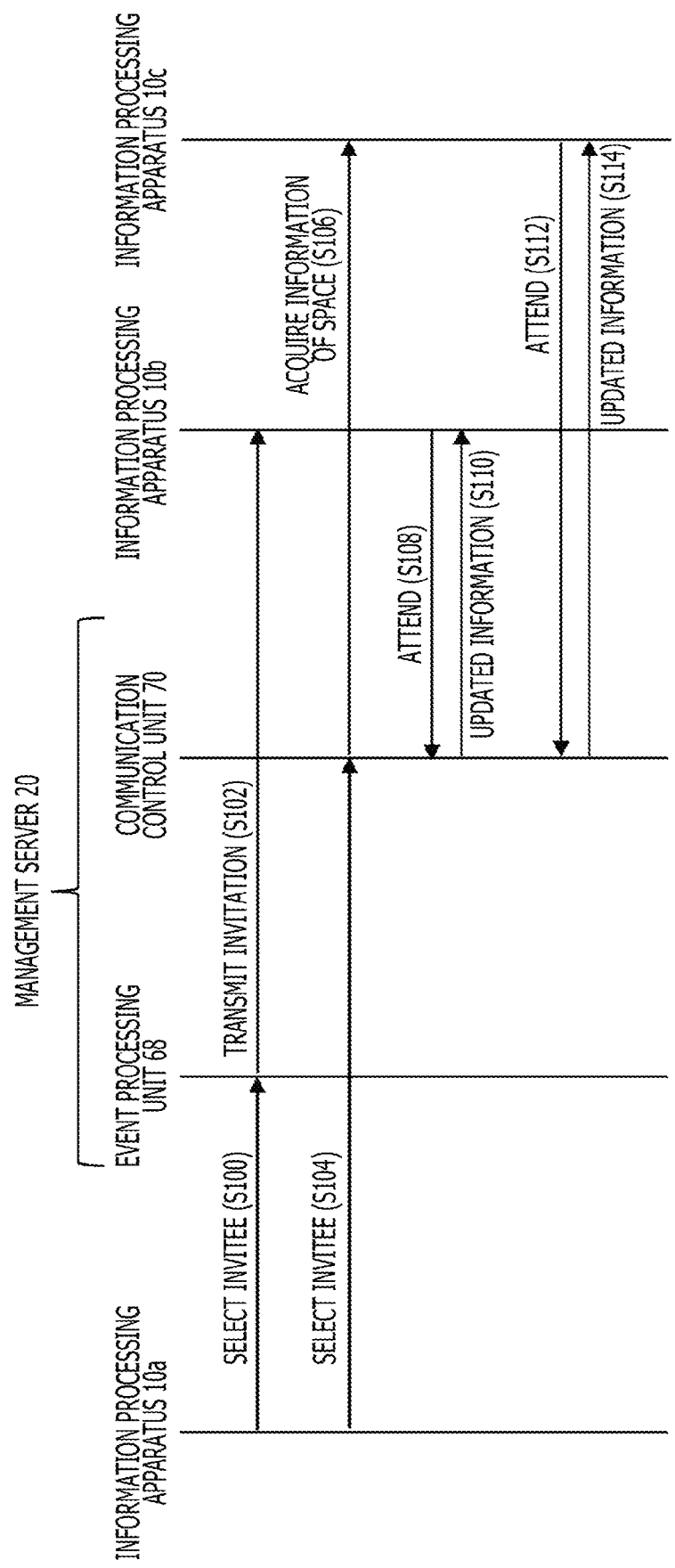
FIG. 10 is a time chart illustrating transmission and reception of data between the information processing apparatus and the management server in a case of further inviting an attendance in the communication space according to the present embodiment.

FIG. 10 is a time chart illustrating transmission and reception of data between the information processing apparatuses 10 and the management server 20 in a case of further inviting an attendance in the communication space. First, when a user attending the communication space designates a user or a community to be invited in the communication space, the information processing apparatus 10*a* of the user transmits information of the invitee to the management server 20 in association with the session ID (S100, S104).

The event processing unit 68 of the management server 20 specifies the identification information of the information processing apparatus 10*b* used by the designated user and transmits an invitation including the identification information of the user, the session ID, and the like to the information processing apparatus 10*b* (S102). In a case where the corresponding event is confirmed, the event ID and the summary of the event may also be transmitted. The communication space control unit 70 of the management server 20 specifies the communication space corresponding to the designated community and displays the invitation to another communication space corresponding to event (S104).

In this case, although the session ID is associated with the invitation, the summary of the event may be displayed, and the invitation may also be associated with the event ID in the case where the corresponding event is confirmed. The invitation displayed in this way is recognized by the user using the information processing apparatus 10*c* to access the communication space (S106). The users recognizing the invitation through the direct notification or in the communication space attend the communication space through the respective information processing apparatuses 10*b* and 10*c* (S108, S112), and receive updated information such as speeches of other users (S110, S114) to realize communication between the users including the newly invited user attending the communication space.

Figure 11:
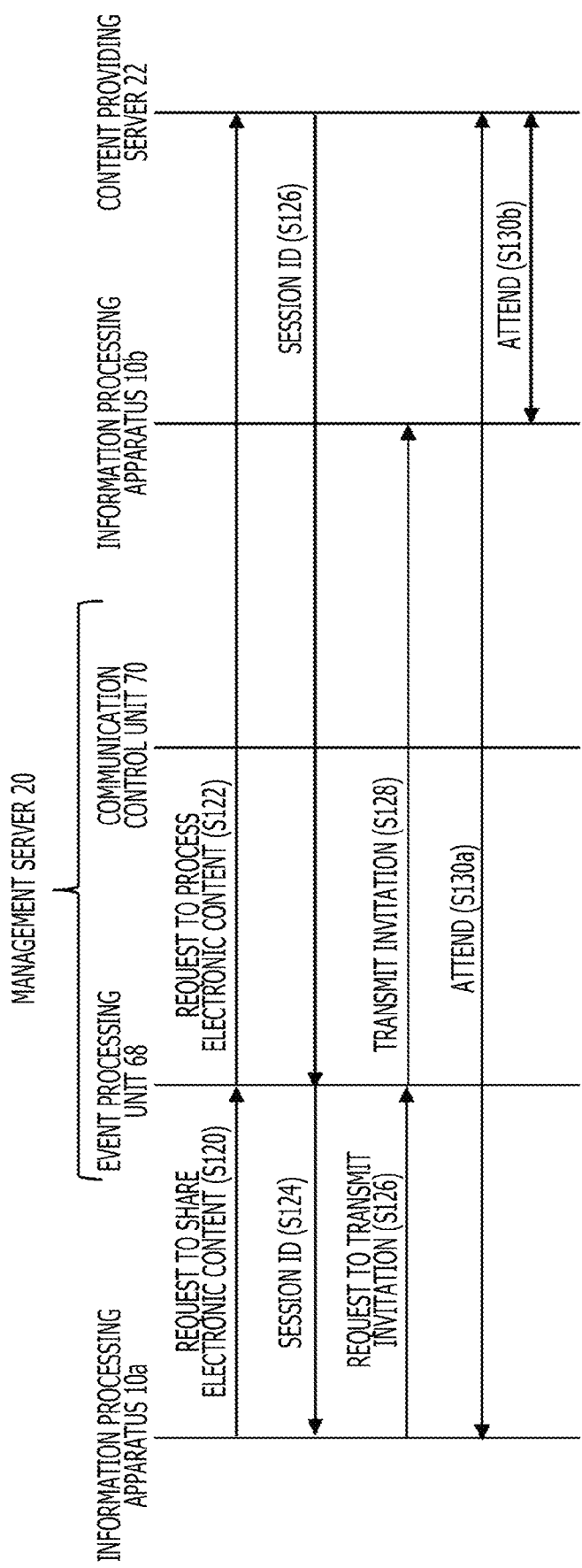
FIG. 11 is a time chart illustrating transmission and reception of data between the information processing apparatus, the management server, and the content providing server in a shift to a phase for sharing electronic content according to the present embodiment.

FIG. 11 is a time chart illustrating transmission and reception of data between the information processing apparatuses 10, the management server 20, and the content providing server 22 in the shift to the phase for sharing electronic content. First, when a user executes an operation of shifting to the electronic content sharing phase in the communication space generated as illustrated in FIG. 9, the information processing apparatus 10*a* used by the user transmits an instruction indicating the execution of the operation to the management server 20 (S120). At this timing or at any previous timing, the management server 20 also acquires the identification information of the electronic content to be shared and the identification information of the sharing members.

When the event processing unit 68 of the management server 20 receives the operation of shifting to the electronic content sharing phase, the event processing unit 68 requests the content providing server 22 to start processing the electronic content to be shared (S122). The processing also includes generation of a session for sharing. When the ID of the generated session is transmitted from the content providing server 22 (S126), the event processing unit 68 of the management server 20 notifies the information processing apparatus 10*a* of the session ID (S124).

When the information processing apparatus 10*a* acquires the session ID, the information processing apparatus 10*a* requests the management server 20 to transmit an invitation to a user attending the communication space or a user selected as a sharing member along with the session ID (S126). In response, the event processing unit 68 of the management server 20 specifies the identification information of the information processing apparatus 10*b* used by the user and transmits the invitation to the information processing apparatus 10*b* along with the session ID (S128).

As a result, the information processing apparatuses 10*a* and 10*b* can enter a common session for sharing the electronic content. Each of the information processing apparatuses 10*a* and 10*b* then accesses the content providing server 22 and uses the session to appropriately receive the data of the electronic content or transmit the details of the operation of the user to thereby realize the sharing of the electronic content (S130*a*, S130*b*).

Figure 12:
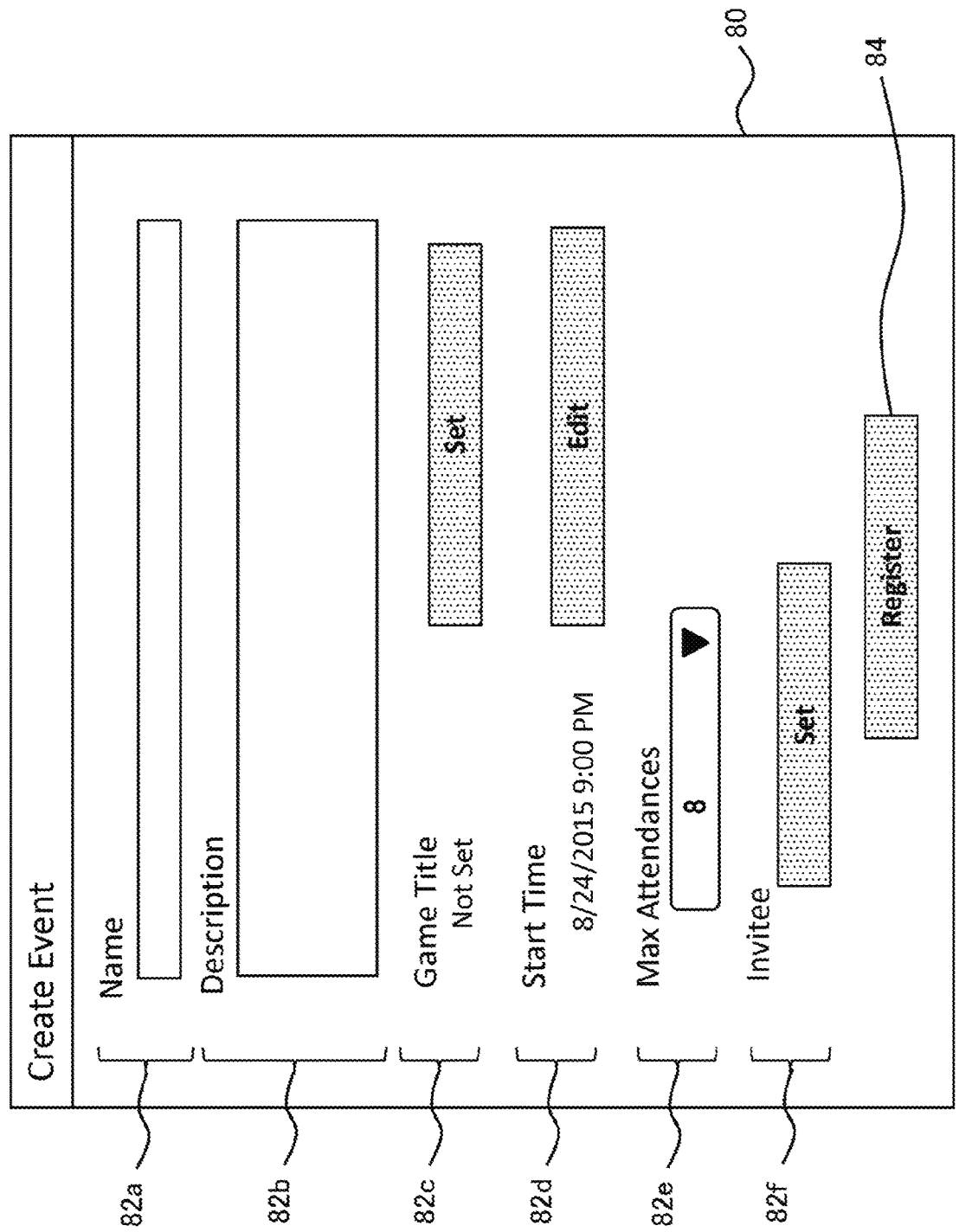
FIG. 12 depicts an example of an event planning input screen displayed in the planning of the event by the user in a preliminary stage in S10 of FIG. 6.

FIG. 12 illustrates an example of an event planning input screen displayed when the user plans the event in a preliminary stage of S10 in FIG. 6. An event planning input screen 80 includes an event name setting field 82*a*, an event description input field 82*b*, a game setting field 82*c*, a start date and time setting field 82*d*, a maximum attendance setting field 82*e*, an invitee setting field 82*f*, and a registration GUI 84.

The event name setting field 82*a* and the event description input field 82*b* include fields for directly inputting character strings as indicated by rectangles in FIG. 12, and the event name, the main point of the event, and the like can be freely input. The game setting field 82*c* includes a GUI of "Set," and electronic content to be shared in the event can be selected. For example, the GUI can be selected and operated to indicate a pulldown display of titles of games that can be selected, and one of the titles can be selected by a pointer. Alternatively, another screen for displaying a list of detailed information and the like of the games and accepting selection may pop up.

When a game is selected, the character string indicating "Not Set" in the game setting field 82*c* is changed to the title of the selected game. The start date and time setting field 82*d* includes a GUI of "Edit" for editing the date and time of the start of the event, and the start date and time of the event can be set. For example, the GUI can be selected and operated to directly edit the start time of the event displayed on the left side.

The maximum attendance setting field 82e includes a GUI for setting an upper limit of the number of users attending the event, and the upper limit can be set in consideration of the number of people, such as players of a game, that can share the electronic content. For example, the GUI can be selected and operated to indicate a pulldown display of the numbers of people that can be set, and one of the numbers can be selected by the pointer. The invitee setting field 82f includes a GUI of "Set" for setting an invitee of the event, and the invitee can be selected along with the event registration.

For example, the GUI can be selected and operated to display a list of icons or nicknames of candidate users, names of communities, names of electronic bulletin boards, and the like, and one of them can be selected by a pointer. Alternatively, another screen for displaying a list of candidates of invitees and accepting selection may pop up. Here, the candidate users or communities are users registered as friends of the user inputting the plan, communities that the user belongs to, communities attended in the past, or the like, and the information is stored in the user information storage unit 50.

Note that the illustrated input items are examples, and not all of the input items may be necessary for the planning of the event. For example, the electronic content to be shared can also be selected in the community space formed at the start of the event, and the selection may be suspended at the stage of the event planning. When the user appropriately inputs the items and selects and operates the registration GUI 84, the event management unit 54 of the event action control unit 48 transmits the details to the management server 20 through the communication unit 52. As a result, the process in S50 of FIG. 8 is realized.

The details of the plan registered once in this way are also stored in the user information storage unit 50 of the information processing apparatus 10 in association with the identification information of the user. As a result, when the same user plans a new event, the details of the plans in the past can be called out and displayed on the event planning input screen. The user can reference the details of the events and the invitees in the past and follow or adjust them to plan a desired event with a little effort.

Figure 13:
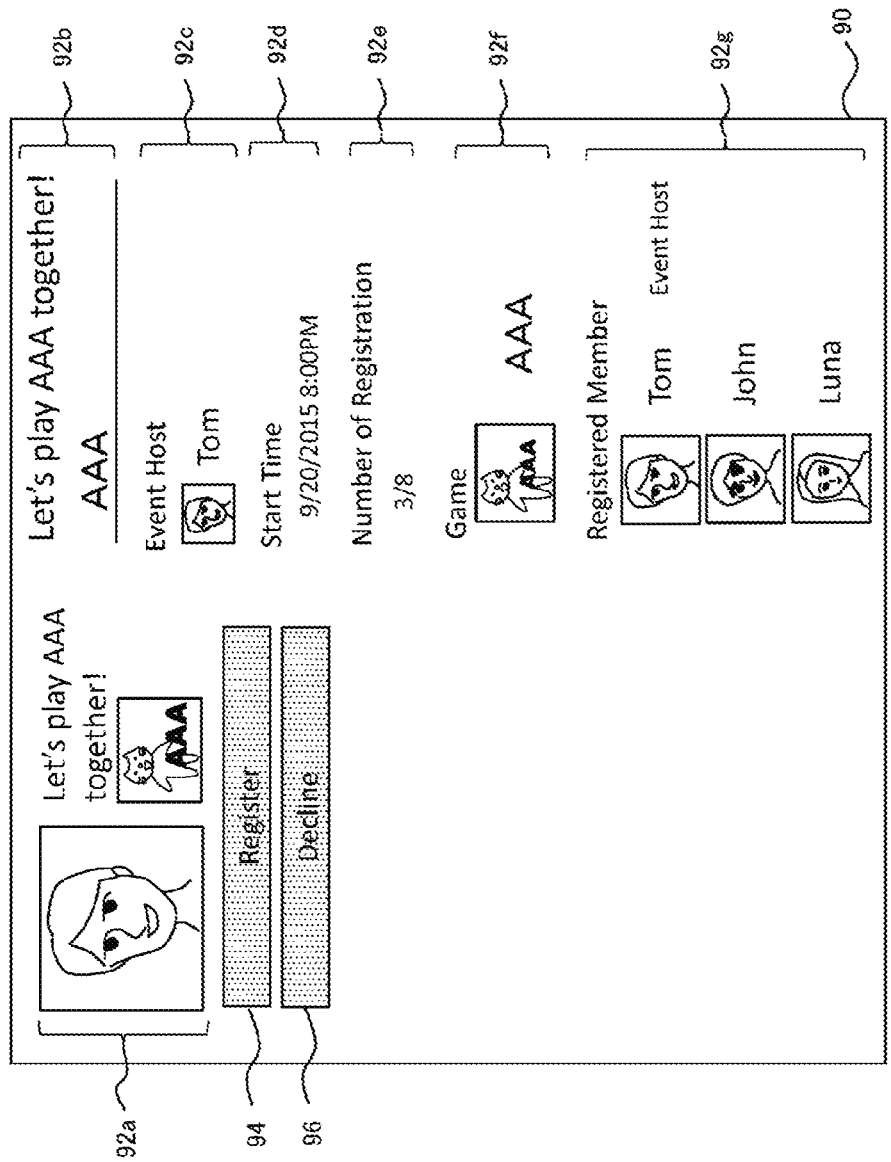
FIG. 13 depicts an example of an event information display screen that can be viewed in the information processing apparatus of a user invited to the event in a period from S14 to S18 in FIG. 6.

FIG. 13 illustrates an example of an event information display screen that can be viewed in the information processing apparatus 10b of the user invited to the event in the period from S14 to S18 in FIG. 6. The screen is displayed when, for example, the user receives a notification of an invitation to a new event in the information processing apparatus 10b and performs an operation of displaying further detailed information. The event management unit 54 of the event action control unit 48 in this case requests the management server 20 for the detailed information of the selected event and obtains information necessary for the display. Note that a similar screen can be displayed as necessary according to the user operation regardless of the attendance registration.

An event information display screen 90 includes an event banner field 92a, an event name field 92b, an event host field 92c, a start date and time field 92d, a number of registration field 92e, a game field 92f, a registered member field 92g, an attendance registration GUI 94, and a decline registration GUI 96. The event banner field 92a on the upper left of the screen is a field for figuring out the summary of the event, and the event banner field 92a includes the event name, the icon of the user planning the event, the banner of the electronic content to be shared, and the like.

The details of the event are displayed on the right half of the screen. The event name field 92b, the event host field 92c, and the start date and time field 92d display the event name and the title of the electronic content to be shared, the icon and the nickname of the user planning the event, and the start time of the event, respectively. The number of registration field 92e displays the number of users registered for attendance with respect to the upper limit of the number of attendances. The game field 92f displays the banner and the title of the electronic content set to be shared.

The registered member field 92g displays the icons and the nicknames of the users registered for attendance at the stage of the display of the screen. Among these, the user planning the event is provided with a character string "Event Host" indicating the user planning the event. Note that the illustrated screen is an example. Other items may be displayed, or the display items may be further limited. In addition, in preparation for the case in which the user does not have an application for activating the electronic content to be shared, the user may be able to select and operate the banner displayed in the game field 92f to display a website of an online shop to purchase the application.

In a case where the user recognizing the details of the invited event on the event information display screen 90 wants to attend the event, the user selects and operates the attendance registration GUI 94. In a case where the user is not to attend the event, the user selects and operates the decline registration GUI 96. The event management unit 54 of the event action control unit 48 receives the details of the operations and transmits the details to the management server 20. This realizes the processes in S16 of FIG. 6 and S62 and S64 of FIG. 8. Note that in the case where the attendance registration GUI 94 is operated, the attendance registration GUI 94 is hidden in the event information display screen 90 after the operation, and the icon and the nickname of the user are additionally displayed in the registered member field 92g. In the case where the decline registration GUI 96 is operated, the event is removed from the event list related to the user.

Although FIG. 13 illustrates the event information display screen displayed in the information processing apparatus 10 of the invited user, an event information display screen with similar details can also be checked in the information processing apparatus 10 of the user planning the event. However, in this case, a detail update GUI and an invitee selection GUI are provided in place of the attendance registration GUI 94 and the decline registration GUI 96. In a case where the detail update GUI is selected and operated, a screen for accepting an update of at least part of the details of the planning of the event, such as the start date and time, is displayed. In a case where the invitee selection GUI is selected and operated, a destination of the transmission of the invitation to the event can be further selected.

In such a case, the event management unit 54 of the event action control unit 48 receives the operation as in the case where an event is newly planned, and the details are transmitted to the management server 20. The management server 20 uniformly manages the change in the details of the plan, the addition of an invitee, and the like and transmits the latest information to each information processing apparatus 10. The user can withhold the attendance registration or newly register for attendance based on the latest information. Note that in a case where the details of the plan are changed, the management server 20 may control the information processing apparatus 10 to notify each user of the change, in a form that the user recognizes the change without displaying the event information display screen.

In addition, in the case where the timer in the information processing apparatus 10 is set to automatically display the event attendance screen at the start of the event, the management server 20 also updates the setting of the timer according to the change in the start date and time. Note that the event information display screen as illustrated in FIG. 13 may be able to be displayed even after the event start time. In this case, a user not registered for attendance can select and operate the attendance registration GUI 94 to immediately switch the screen to the community space for the event, and the user can easily attend the event from the middle of the event.

Figure 14:
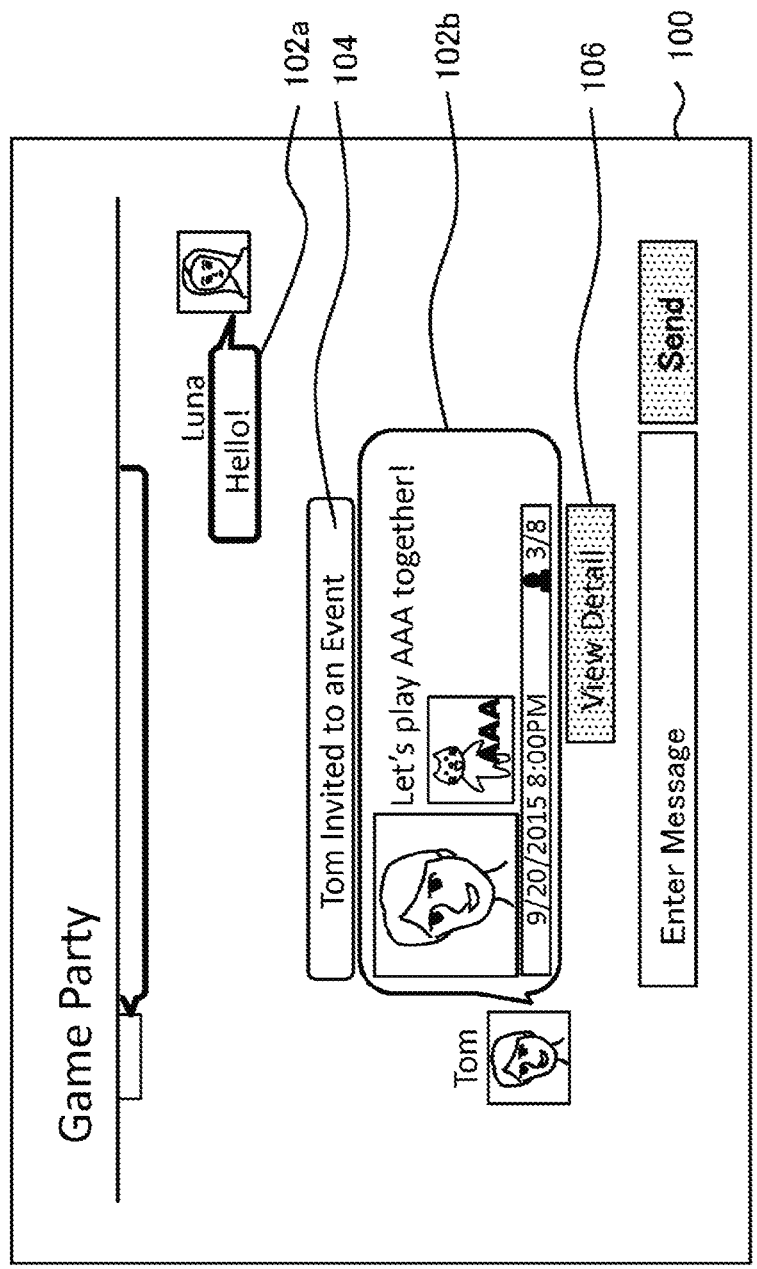
FIG. 14 depicts an example of a screen displayed on the information processing apparatus of the user attending the corresponding communication space in a case where a community is designated as an invitee of the event according to the present embodiment.

FIG. 14 illustrates an example of a screen displayed on the information processing apparatus 10 of the user attending the corresponding communication space in a case where a community is designated as an invitee of the event. In the example, a place of text chat called "Game Party" is formed, and a plurality of users are talking. The screen as illustrated in FIG. 14 is displayed in the process of S58 in FIG. 8 when a community is selected as an invitee on the event planning input screen 80 illustrated in FIG. 12. However, the invitee can be selected at an arbitrary timing before or after the start of the event, and a screen similar to the illustrated screen is displayed as necessary at the point that the community is selected as an invitee.

In a text chat screen 100, speeches of a plurality of users attending the chat are arranged in the order of speech, in which the vertical direction is the time axis. Details of the speeches are displayed in speech bubbles (for example, speech bubbles 102a and 102b) along with the icons or the nicknames of the speakers. The planning of a new event is indicated in the speech bubble 102b of the speech bubbles. The details displayed here allow to understand the summary of the event at a glance as in the event banner field 92a of the event information display screen 90 illustrated in FIG. 13. The illustrated example further indicates the event start time and the number of users registered for attendance with respect to the upper limit of the number of attendances.

Furthermore, character information 104 indicating that the speaker "Tom" is making an invitation to the event and a GUI of "View Detail" for displaying the detailed information of the event are displayed above the speech bubble 102b. When the user viewing this selects and operates the GUI, the event information display screen 90 illustrated in FIG. 13 is displayed. As a result, the user can recognize more detailed information and register for attendance. Note that the illustrated configuration of the communication space is an example, and the format is not limited as long as the information regarding the planned event can be displayed as a speech or a topic in a service of SNS or the like where a plurality of users talk or share information.

Figure 15:
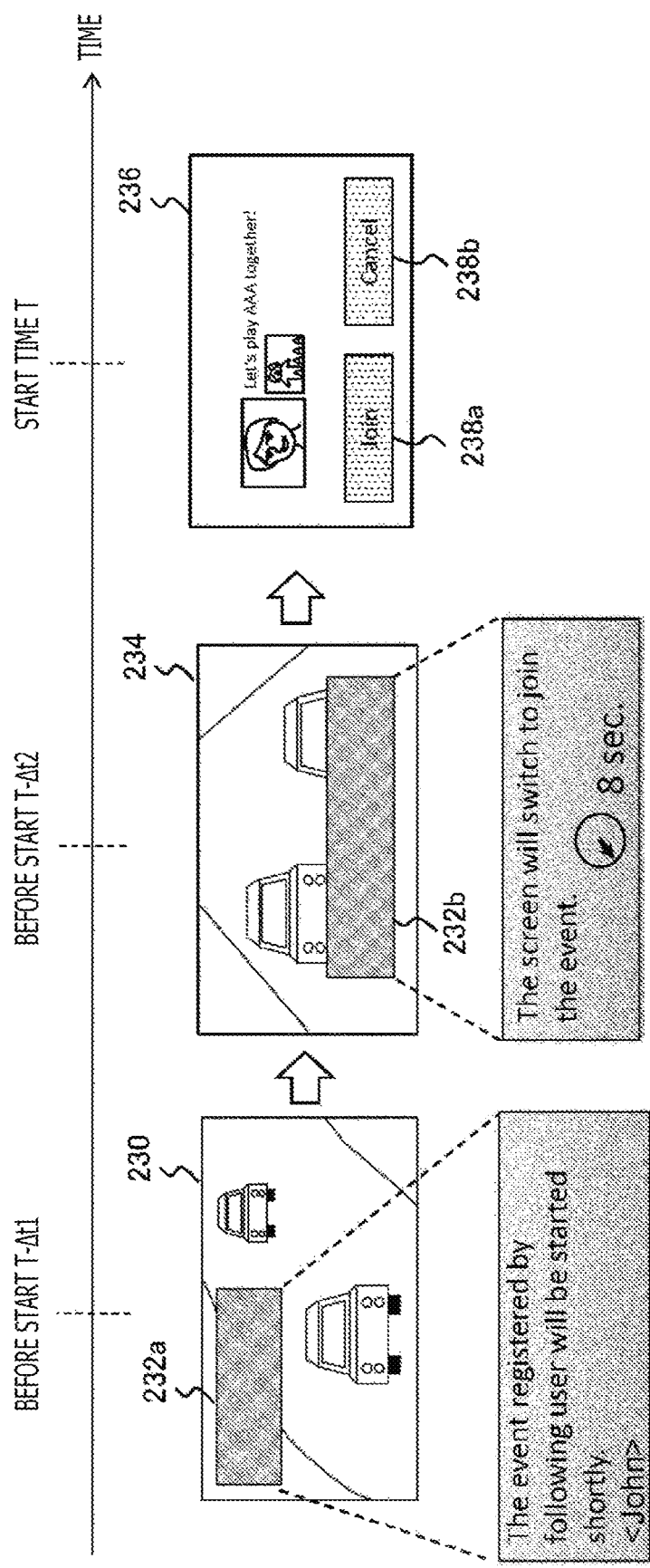
FIG. 15 depicts an example of transition of a screen displayed at the start of the event on the information processing apparatus used by the user registered for attendance according to the present embodiment.

FIG. 15 illustrates an example of transition of a screen displayed at the start of the event in the information processing apparatus 10 used by the user registered for attendance. It is assumed in the example that the user is playing a game, such as a race game, outside of the event. In addition, examples of the methods for realizing the transition of the screen as illustrated in FIG. 15 include the case in which the management server 20 sets the timer of the information processing apparatus 10 in advance and the case in which the management server 20 issues a request to the information processing apparatus 10 on the spot as described above.

First, at time that is a predetermined time period Δt1 before start time T of the event, the event management unit 54 of the event action control unit 48 in each information processing apparatus 10 displays, over a display screen 230 at the time, a message window 232a indicating that the event start time is approaching. In the example of FIG. 15, a sentence indicating that the start time of the event registered for attendance is approaching and the name "John" of the user registered for attendance in the information processing apparatus 10 are written in an enlarged display below the display screen 230. Here, the predetermined time period Δt1 is, for example, one minute.

Next, when time that is a predetermined time period Δt2 before the start time T of the event is detected, a message window 232b indicating a countdown for automatic switch to the screen for the event is displayed over a display screen 234 at the time. Here, the predetermined time Δt2 is a value smaller than Δt1 and is, for example, 15 seconds. After the display of the first message window 232a, the display of the original message window 232a may be maintained until the next message window 232b is displayed, or the message window 232a may be hidden after a predetermined time period.

As in an enlarged display below the display screen 234, a value and a clock indicating the countdown of the time period before the switch of the screen are displayed in seconds on the message window 232b. The transition of the screen up to here corresponds to S70a and S70b in FIG. 9. Then, when the start time T comes, the event management unit 54 switches the display to a screen 236 as an initial screen of the event for finally confirming the attendance or the decline of attendance to the communication space. A GUI 238a of "Join" for confirming the attendance and a GUI 238b of "Cancel" for confirming the decline are displayed on the screen 236 along with the information of the event.

In the case where the GUI 238a for confirming the attendance is selected and operated, the display is shifted to a screen indicating the space of the communication between event attendances. More specifically, the information processing apparatus 10a of the user confirming the attendance first and the management server 20 generate the communication space in the process of S72 to S82 of FIG. 9 and acquire the session ID. The information processing apparatus 10b of the user subsequently confirming the attendance and the management server 20 acquire the same session ID in the process of S84 and S86 in FIG. 9. The information processing apparatuses 10a and 10b then attend the session, and the screen is switched to the communication space.

Note that at the stage that the message windows 232a and 232b are displayed, the attendance to the event may be able to be canceled by receiving a predetermined cancel operation or a logout operation of the user registered for attendance. In this case, the display is returned to the originally displayed screen of the race game or the like instead of the switch to the screen 236. The display is also returned to the original screen in the case where the GUI 238b for confirming the decline is selected and operated on the screen 236.

Although the example illustrates the transition of the screen in the case of automatically attending the event at the start time of the event, various patterns can be actually considered according to the situations from moment to moment. For example, the patterns can be sorted based on whether the information processing apparatus 10 is in the sleep state as described above, whether the user registered for attendance is logging in, or whether a passcode needs to be input to log in. Those skilled in the art will appreciate that various displays and checks can be performed according to the conditional branches.

Figure 16:
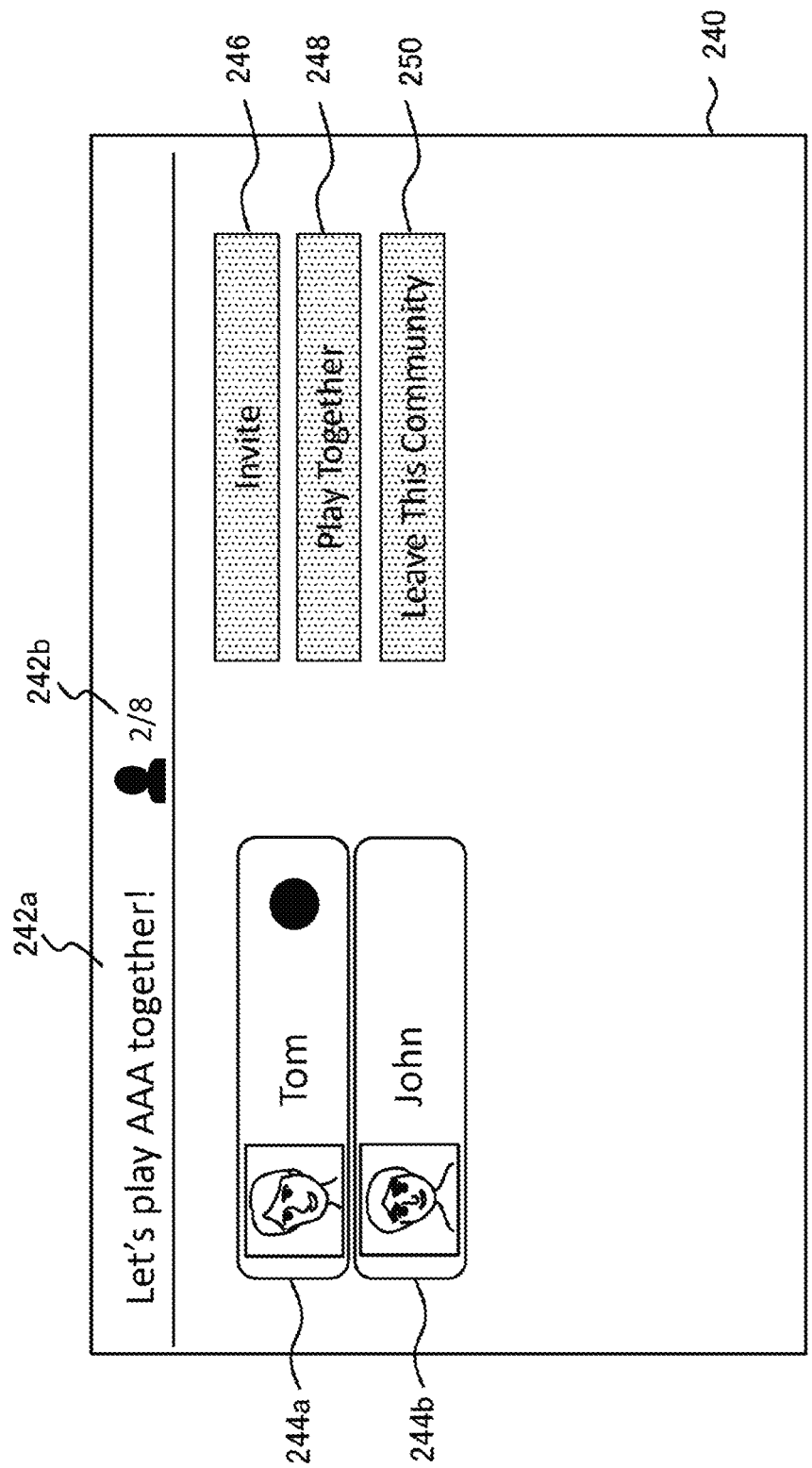
FIG. 16 is a view illustrating a screen indicating the communication space displayed on the information processing apparatus as part of the event according to the present embodiment.

FIG. 16 illustrates a screen indicating the communication space displayed on the information processing apparatus 10 as part of the event. A communication screen 240 is displayed in the case where the GUI 238a for confirming the attendance is selected and operated on the screen 236 of FIG. 15. However, the route to the display of the screen is not limited to this.

For example, in a case where the user not registered for attendance at the time of the start of the event displays the event information display screen as illustrated in FIG. 13 to perform an attendance registration operation, the process of attending the communication space is executed on the spot, and the display is switched to the communication screen 240. This mode is effective even in the case where the automatic event attendance as illustrated in FIG. 14 is not set. Furthermore, when a newly invited user registers for attendance on the communication screen 240, the communication screen 240 is also displayed in the information processing apparatus 10 of the user.

The communication screen 240 of FIG. 16 illustrates a voice chat and includes an event name 242a, the number of users 242b attending at this point with respect to the upper limit of the number of attendances, lists 244a and 244b of the attending users, and various GUIs 246, 248, and 250. The lists 244a and 244b of the users are arrangements of the icons and the nicknames of the users attending the communication space, and a black circle is added to the currently speaking user. The number of users displayed in the list increases with an increase in the number of users confirming the attendance through the screen 236 of FIG. 15 or the like, and the users can freely talk to each other.

However, the means of communication is not limited to the voice chat as described above. In addition, the screen configuration of the communication space is not limited to the illustrated one. The GUI 246 of "Invite" for further designating an invitee, the GUI 248 of "Play Together" for starting to share the electronic content, and the GUI 250 of "Leave This Community" for leaving from the communication space are provided as GUIs displayed on the communication screen 240. In a case where one of the users attending the communication space selects and operates the GUI 246 for further designating an invitee, a user or a community not invited at the time of the event planning can be additionally invited, or an invited user not attending the place can be invited again.

The function of the GUI 246 may be equivalent to the function of the invitee setting field 82f in the event planning input screen 80 of FIG. 12. As a result, the notification of the invitation to the event is issued to the information processing apparatus 10 of the invited user, or the summary of the event is displayed in another community space in a format as illustrated in FIG. 14. The event information display screen 90 as illustrated in FIG. 12 is then displayed on each information processing apparatus 10 according to the user operation, and when the attendance registration operation is performed, the user becomes a new attendance of the community space illustrated in FIG. 15.

In a case where one of the users attending the communication space selects and operates the GUI 248 for starting to share the electronic content, the phase is shifted through a final confirmation screen described later to a phase in which the users attending the communication space at this point share the electronic content. The electronic content may be content set at the event planning or may be content determined in the communication space. The users attending the communication space automatically become the sharing members of the electronic content, and the users can share the electronic content as an extension of the communication space without separately setting the members again.

More specifically, the information processing apparatus 10a of the user selecting and operating the GUI 248 for starting to share the electronic content, the management server 20, and the content providing server 22 execute the process from S120 to S124 in FIG. 11 and invite the information processing apparatuses 10b of the other users as illustrated in S126 and S128. The information processing apparatuses 10a and 10b and the content providing server 22 transmit and receive data based on the session ID transmitted at this point, and the electronic content is shared (S130a, S130b).

Figure 17:
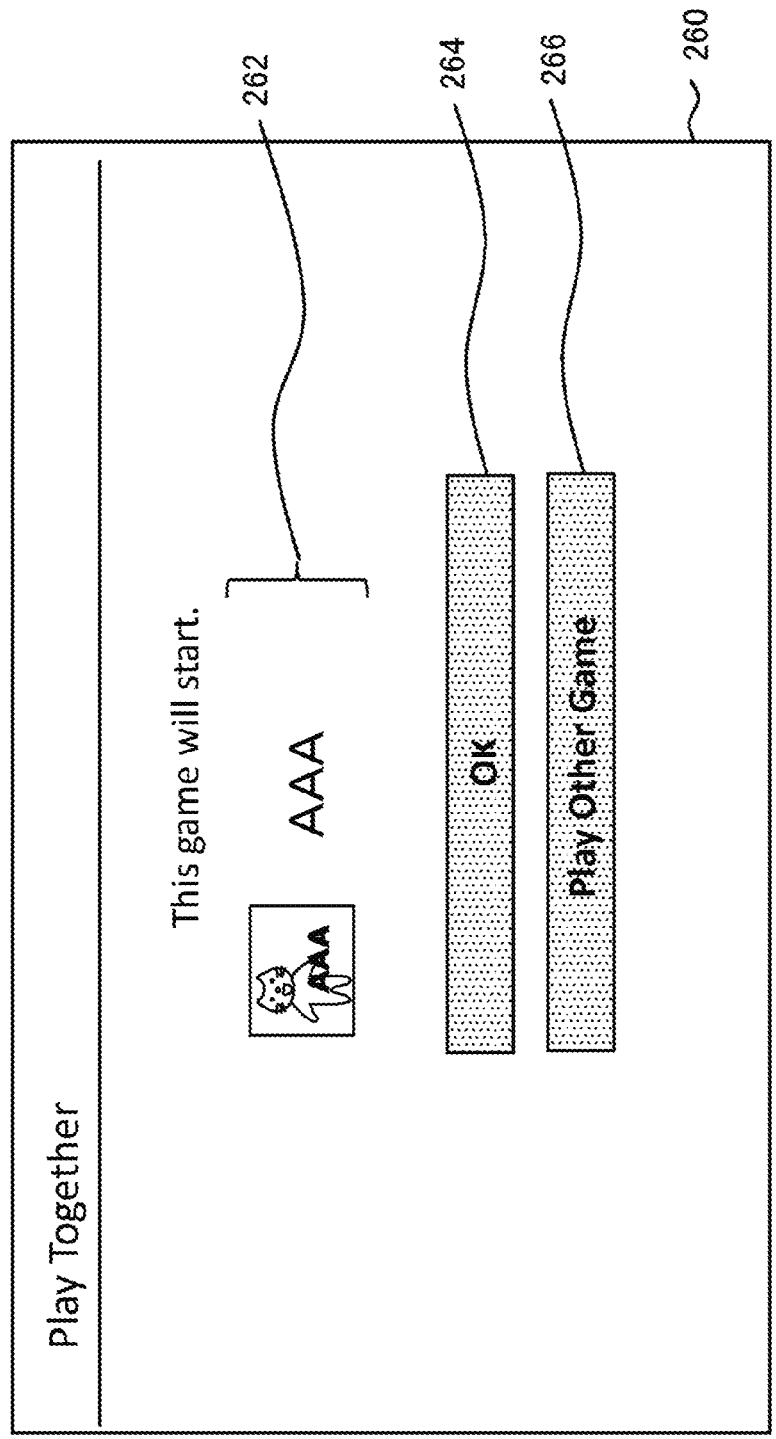
FIG. 17 is a view illustrating a final confirmation screen of the shift to the electronic content sharing phase displayed according to the present embodiment.

FIG. 17 illustrates a final confirmation screen of the shift to the electronic content sharing phase displayed when the GUI 248 for starting to share the electronic content is selected and operated in FIG. 16. The screen illustrates a case in which the electronic content to be shared is set at a stage before the operation of the GUI 248 for starting to share the electronic content, such as at the planning of the event. Information 262 such as the banner and the title of the set electronic content, a GUI 264 of "OK" for confirming the sharing, and a GUI 266 of "Play Other Game" for selecting other electronic content again are displayed on a final confirmation screen 260.

Figure 18:
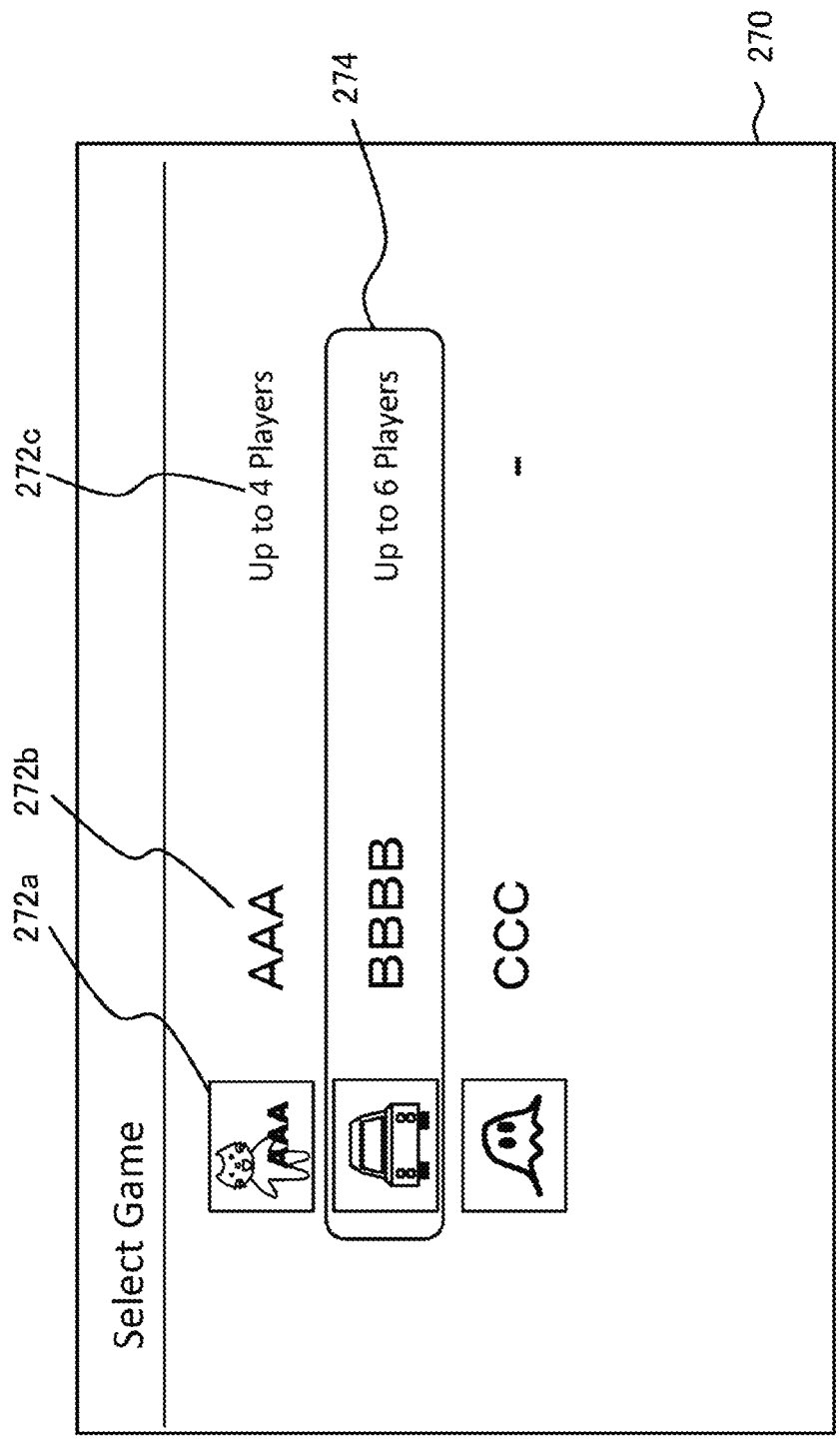
FIG. 18 is a view illustrating a screen for receiving selection of electronic content displayed according to the present embodiment.

In a case where the GUI 264 for confirming the sharing is selected and operated, the management server 20 receives the operation and performs a procedure for starting to share the electronic content. In a case where the GUI 266 for selecting other electronic content again is selected and operated, a screen for receiving the selection of the electronic content is separately displayed. FIG. 18 illustrates a screen for receiving the selection of the electronic content in such a case. A list of banners 272a and titles 272b of the electronic content that can be shared is displayed on an electronic content selection screen 270. In a case where there is an upper limit to the number of people that can share the electronic content, information 272c of the upper limit is also displayed.

The information processing apparatus 10 may hold the details displayed here, or the information processing apparatus 10 may requests the management server 20 for the data when the electronic content selection screen 270 needs to be displayed. Other than the electronic content that can be provided by the content providing server 22, information of official events held at this point, electronic content provided by the official events, and the like may also be included in the display of the electronic content that can be shared. When the user performs an operation of confirming the selection by, for example, moving a frame 274 on the electronic content selection screen 270, the final confirmation screen 260 as illustrated in FIG. 17 is displayed, and the shift to the sharing phase of the selected electronic content can be finally confirmed.

Note that the electronic content selection screen 270 illustrated in FIG. 18 is also displayed in a case where the electronic content to be shared is not set at the point of the selection and operation of the GUI 248 for starting to share the electronic content on the communication screen 240 of FIG. 16. As a result, the electronic content can be held at the planning of the event, and optimal electronic content can be selected according to the direction and excitement of the conversation, the number of attendances, the attending members, and the like in the communication space.

The upper limit is set for the number of people that can share the electronic content, and an opportunity for selecting the members that share the electronic content is provided in a case where the number of users attending the communication space exceeds the upper limit. For example, the management server 20 detects such a case by comparing the numbers of people at the point of the operation of the GUI 248 for starting to share the electronic content. The management server 20 then notifies the information processing apparatus 10 of the operating user that the case is detected. Accordingly, the information processing apparatus 10 displays a selection screen of the members and receives an input of selection.

Figure 19:
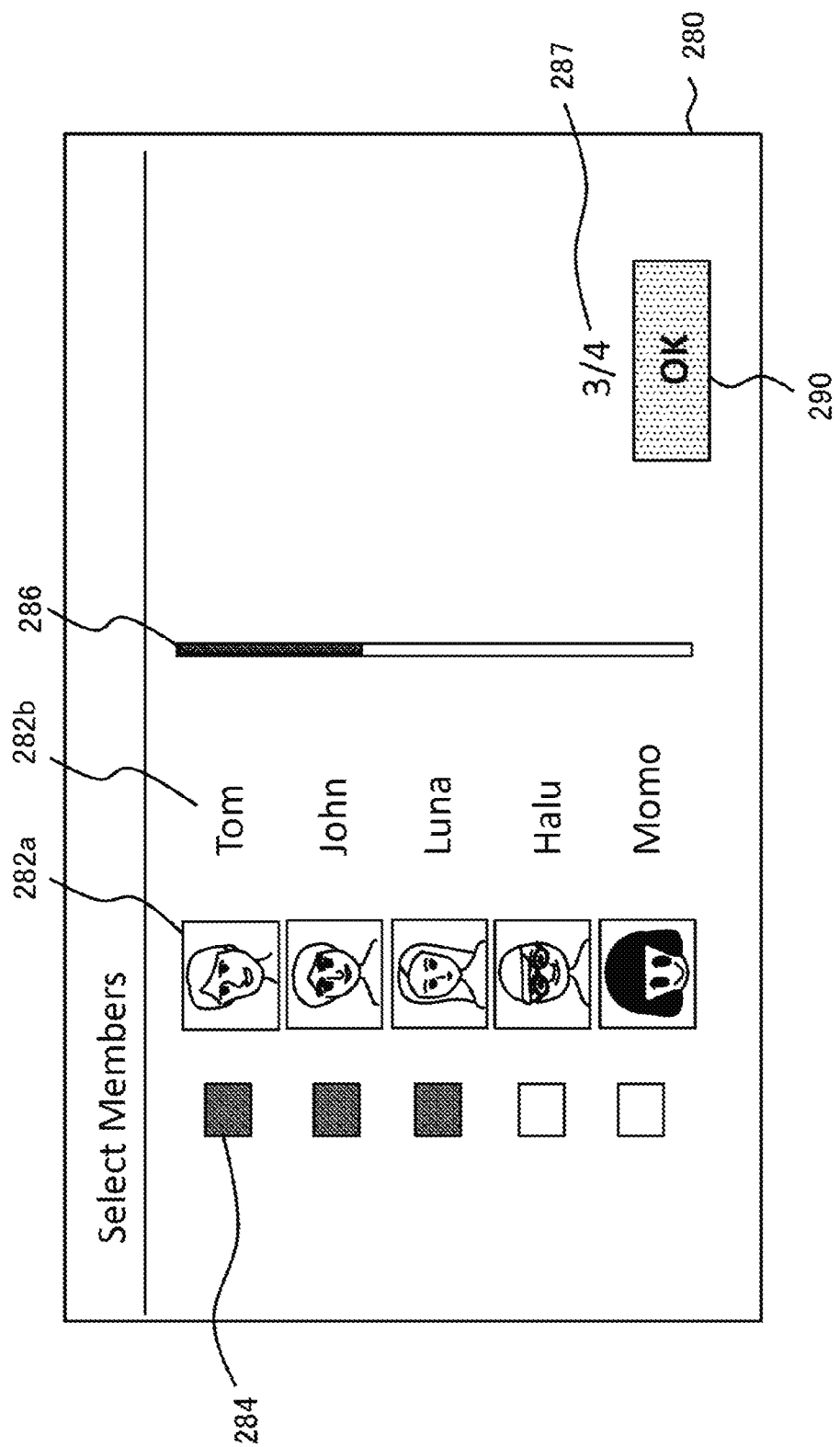
FIG. 19 is a view illustrating a screen for receiving selection of members that share the electronic content displayed according to the present embodiment.

FIG. 19 illustrates a screen for receiving selection of members that share the electronic content. A list of icons 282a and nicknames 282b of the users attending the communication space is displayed on a sharing member selection screen 280. Necessary information, such as situations of past attendance and records of games of each user, may also be displayed. Furthermore, in a case where the list does not fall within one screen, a slide bar 286 may be displayed to allow scrolling the list. Information 287 indicating the number of selected users with respect to the upper limit of the number of people that can share the target electronic content is further displayed on the sharing member selection screen 280.

The user that manages the selection of the members checks the information 287 and uses a pointer or the like to designate check boxes 284 displayed at the top of each user to select users. Obviously, selection exceeding the upper limit is invalid. After selecting the users not exceeding the upper limit of the number of users in this way, the user selects and operates a GUI of "OK" for confirming the selection. The management server 20 receives the operation input and transmits the invitations to the information processing apparatuses 10b of the selected users according to the request from the information processing apparatus 10a in S126 of FIG. 11. As a result, the members further narrowed down from the attendances in the communication space can start to share the electronic content.

Figure 20:
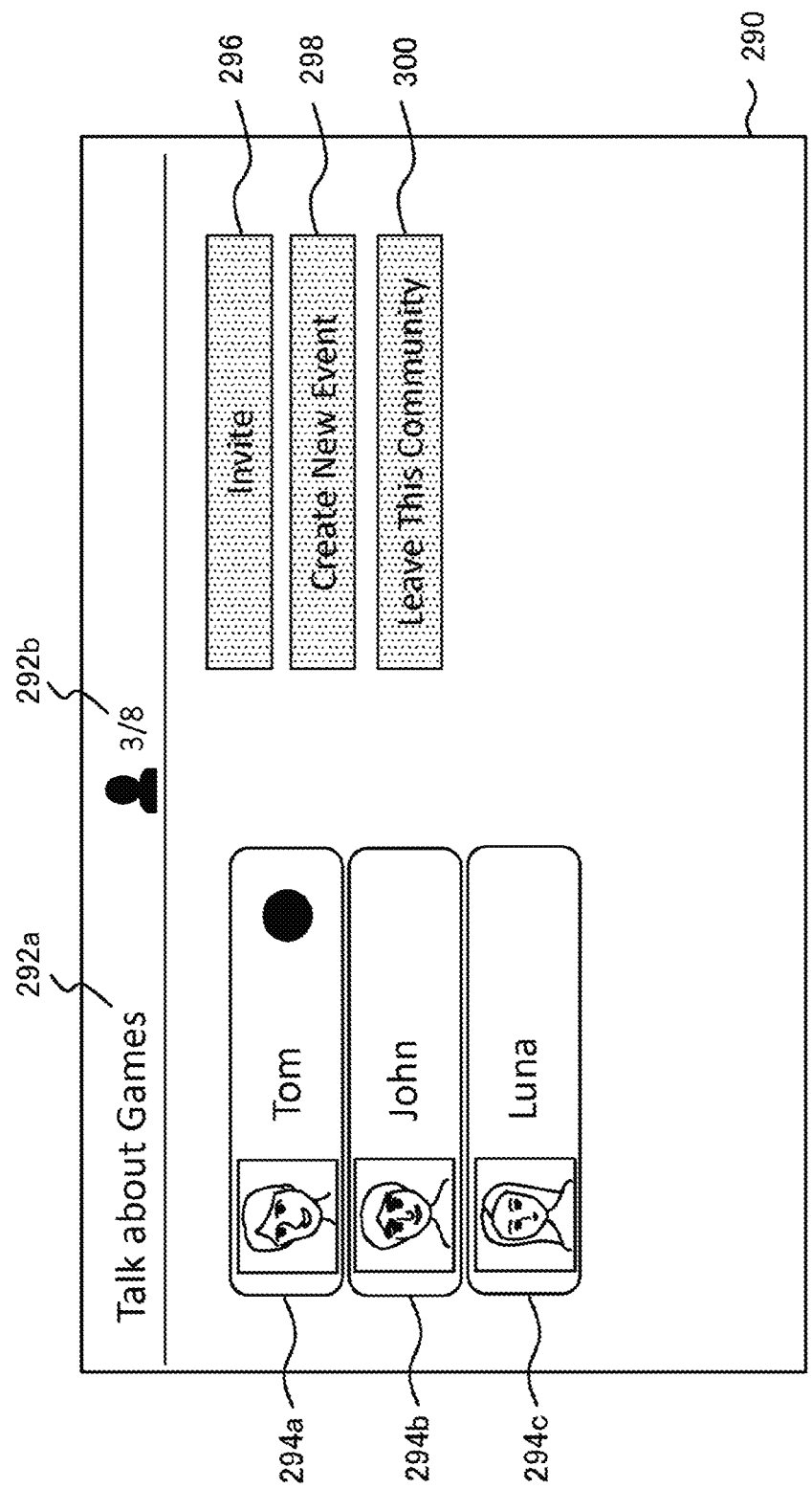
FIG. 20 is a view illustrating a screen indicating a communication space that can generate an event in the middle of the event according to the present embodiment.

FIG. 16 illustrates the screen of the communication space displayed as part of the event after the start of the event planned in advance. On the other hand, the event may also be generated in the communication space as described above. FIG. 20 illustrates a screen indicating the communication space that can generate an event in the middle of the event. A communication screen 290 is displayed, for example, in a case where the user performs a generation operation of the communication space at an arbitrary timing.

The communication screen 290 of FIG. 20 illustrates a voice chat as in the case of FIG. 16 and includes a community name 292a, the number of users 292b attending at this point with respect to the upper limit of the number of attendances, lists 294a, 294b, and 294c of the attending users, and various GUIs 296, 298, and 300. The number of users 292b attending and the lists 294a, 294b, and 294c of the attending users are similar to the number of users 242b attending and the lists 244a and 244b of the attending users in the communication screen 240 of FIG. 16. However, the means of communication is also not limited to the voice chat in this case.

In addition, the GUI 296 of "Invite" for further setting the invitee and the GUI 300 of "Leave This Community" for leaving from the place of communication also have functions similar to the GUI 246 and the GUI 250 illustrated in FIG. 16, respectively. On the other hand, the GUI 298 of "Create New Event" for creating an event is provided on the screen in place of the GUI 248 for starting to share the electronic content in FIG. 16. The GUI 298 is selected and operated to display an event detail input screen similar to the event planning input screen 80 illustrated in FIG. 12, and the details of the event can be input.

However, since the communication space is already generated, and the attendances are determined in this case, part of the input items can be eliminated. For example, in a case where the users attending the communication space become the sharing members of the electronic content, the maximum attendance setting field 82e or the invitee setting field 82f may be eliminated, or the members may be confirmed to display a list of the members. In addition, in preparation for a case of immediate shift to the sharing phase of the electronic content, a GUI for starting to share the electronic content may be further displayed on the event planning input screen.

When the GUI is selected and operated, the information processing apparatus 10a of the user creating the event, the information processing apparatuses 10b of the other users attending the communication space, the management server 20, and the content providing server 22 execute a process as illustrated in FIG. 11, and the sharing of the electronic content is started. Note that until the sharing of the electronic content is started, the final confirmation of the shift to the sharing phase, the reselection of the electronic content, the selection of the sharing members, and the like may be appropriately accepted.

Figure 21:
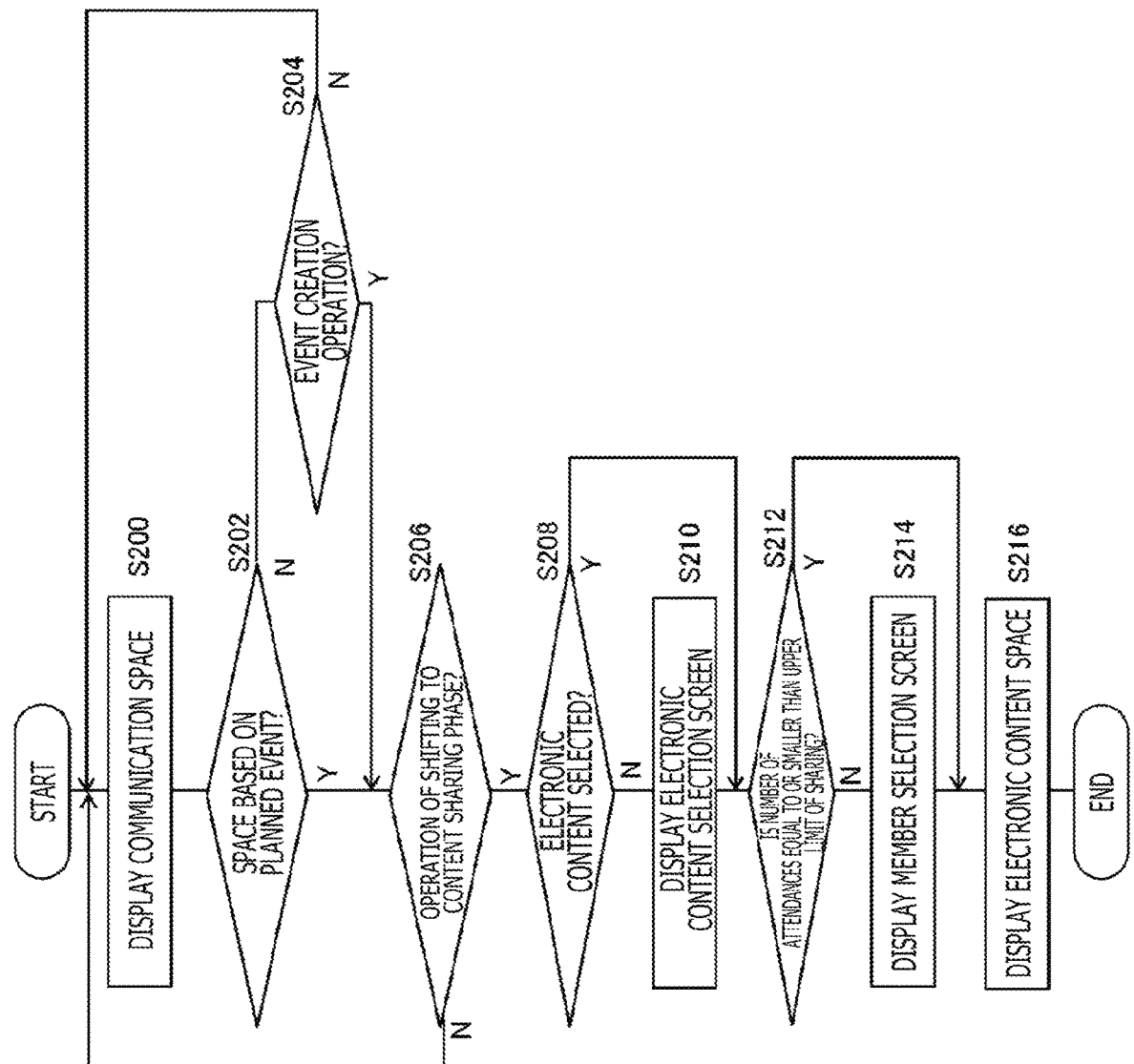
FIG. 21 is a flow chart illustrating an example of procedure of a display process in the information processing apparatus executed in the shift from the communication space to the content sharing phase according to the present embodiment.

FIG. 21 is a flow chart illustrating an example of procedure of a display process in the information processing apparatus 10 executed at the shift from the communication space to the content sharing phase. Note that the flow chart focuses on a transition process of the display, and a determination process for branching the process is separately executed by the management server 20 and the like. First, the information processing apparatus 10 displays the screen indicating the communication space (S200). There are a case in which the communication space is generated in advance as part of the planned event and a case in which the communication space is generated by the user at an arbitrary timing regardless of the event.

In the former case (Y in 202), the communication screen as illustrated in FIG. 16 is displayed, and the information processing apparatus 10 waits for the operation of the GUI for starting to share the content (N in S206). In the latter case (N in 202), the communication screen as illustrated in FIG. 20 is displayed, and the information processing apparatus 10 waits for the operation of the GUI for creating the event (N in S204). When the GUI for creating the event is operated, the details of the event are input on the event detail input screen (Y in S204), and the information processing apparatus 10 waits for the operation of the GUI for starting to share the content (N in S206).

In the standby time periods, conversations between the users may be appropriately displayed, or designation of a user or a community to be newly invited may be received. If the GUI for starting to share the content is operated (Y in S206) and if the electronic content to be shared is not selected (N in S208), the information processing apparatus 10 displays the electronic content selection screen and receives an input of selection (S210).

If the electronic content is selected (Y in S208) and if the number of users attending the communication space exceeds the upper limit of the number of people that can share the electronic content (N in S212), the information processing apparatus 10 displays the member selection screen and receives an input of selection (S214). In this way, if the members are selected or if the number of users attending the communication space is equal to or smaller than the number of people that can share the electronic content from the beginning (Y in S212), the information processing apparatus 10 appropriately executes the process of shifting to the electronic content sharing phase to switch the screen to the space of the electronic content (S216).

According to the present embodiment described above, the virtual space that can realize communication between a plurality of users is provided in a preliminary stage of the sharing of the electronic content by the users. As a result, the start time of sharing, which tends to be fixed because users at different locations attend, can be adjusted on the spot. Therefore, some delay caused by circumstances of individual users can be permitted, and the sharing can be started in an optimal state.

In addition, the operation of shifting to the electronic content sharing phase is received in the communication space, and the management server performs control such that the users in the space become the sharing members. As a result, even if the entity providing the electronic content is different from the entity providing the communication service, there is no labor for the user to newly log in again or separately gather the attendances. Therefore, the user can enter the world of electronic content while the excitement in the communication space is maintained.

Furthermore, the user plans the event, and the attendances are limited to the users or the communities designated there. Therefore, the event can be held in an optimal environment in terms of convenience or preference of individuals, human relations, and the like. In addition, not only the sharing start time, but also the electronic content to be shared, the members that share the electronic content, and the like can be determined in the communication space. In this way, the situations on the spot, such as the direction of conversation in the communication space, the number of attendances, and the members, can be further considered to construct a most enjoyable electronic content sharing space according to the circumstances.

The present invention has been described based on the embodiment. The embodiment is exemplary, and those skilled in the art will appreciate that the combination of the constituent elements and the processes can be modified in various ways, and the modifications are also within the scope of the present invention.

REFERENCE SIGNS LIST

1 Information processing system, 10 Information processing apparatus, 14 Input apparatus, 16 Display apparatus, 20 Management server, 22 Content providing server, 23 CPU, 24 GPU, 26 Main memory, 42 Input information acquisition unit, 44 Information processing unit, 46 Output data generation unit, 48 Event action control unit, 50 User information storage unit, 54 Event management unit, 56 Communication control unit, 58 Content sharing control unit, 62 Event management unit, 64 Event information storage unit, 66 User information storage unit, 68 Event processing unit, 70 Communication space control unit, 78 Electronic content processing unit

INDUSTRIAL APPLICABILITY

In this way, the present invention can be applied to various information processing apparatuses, such as a game apparatus, a mobile terminal, a personal computer, and a server, and to an information processing system and the like including the information processing apparatuses.

The invention claimed is:

1. An event management server that manages an event in which a plurality of users operating different information processing apparatuses share electronic content provided through a network, the event management server comprising:
   a communication space control unit that generates a virtual space in which the plurality of users can communicate with one another in event planning discussions and in which any one of the plurality of users can plan the event and specify which of the plurality of users are invited to the event, and that accepts attendance to the event through each information processing apparatus;
   an event processing unit that receives an operation of starting to share the electronic content at the event in the virtual space through the information processing apparatus and that carries out a process for starting to share the electronic content at the event; and
   an event management unit that receives registration of planning of the event including start date and time input to the information processing apparatus by one user; wherein:
   during the event the plurality of users can continue to communicate with one another in the virtual space in mutually desirable discussions, and
   the communication space control unit receives, through the information processing apparatus, an operation in the virtual space for inviting a user attending another virtual space, performs control to display, in the other virtual space, information regarding the event, and accepts attendance of the user registered for attending the virtual space based on the displayed information.

2. The event management server according to claim 1, wherein the event processing unit sets, as members that share the electronic content, the plurality of users attending the virtual space or users selected from the plurality users attending the virtual space, and carries out the process for starting the sharing.

3. The event management server according to claim 1, wherein the communication space control unit generates the virtual space for the event according to opening of the registered event.

4. The event management server according to claim 3, wherein
   the event management unit receives designation of a user or a community to be invited to the event in the planning of the event and further receives attendance registration performed as a result of display of information regarding the event on the information processing apparatus of the user included in the invitee, and
   the communication space control unit accepts attendance of the user registered for attendance.

5. The event management server according to claim 1, wherein
   the event processing unit controls the information processing apparatus of the user to execute a process of notifying the user registered for attending the event, the notification process indicating that the event is to be started at a predetermined timing based on event start time.

6. The event management server according to claim 1, further comprising:
   an event management unit that receives an operation of generating the event in the virtual space through the information processing apparatus, wherein
   the event processing unit receives an operation of starting to share the electronic content in the virtual space in which the event is generated.

7. The event management server according to claim 1, wherein
   the event processing unit receives selection of electronic content to be shared in the virtual space and carries out a process for starting to share the selected electronic content.

8. The event management server according to claim 1, wherein the event processing unit receives an operation of inviting another user in the virtual space through the information processing apparatus and transmits information regarding the event to the information processing apparatus of the user, and the communication space control unit accepts attendance of the user registered for attending the virtual space based on the transmitted information.

9. An information processing apparatus operated by a respective one of a plurality of users for attending an event in which the plurality of users share electronic content provided through a network, the information processing apparatus comprising:

a communication control unit that executes a process regarding communication in a virtual space in which the plurality of users can communicate with one another in event planning discussions and in which any one of the plurality of users can plan the event and specify which of the plurality of users are invited to the event, according to an operation of attending the event in the virtual space;

a content sharing start control unit that receives an operation of starting to share the electronic content at the event in the virtual space and that transmits the operation to an event management server managing the event to thereby cause the event management server to carry out a process for starting to share the electronic content at the event;

an event management unit that receives registration of planning of the event including start date and time input to the information processing apparatus by one user, wherein during the event the plurality of users can continue to communicate with one another in the virtual space in mutually desirable discussions, and the communication control unit receives, through the information processing apparatus, an operation in the virtual space for inviting a user attending another virtual space, performs control to display, in the other virtual space, information regarding the event, and accepts attendance of the user registered for attending the virtual space based on the displayed information.

10. The information processing apparatus according to claim 9, wherein the communication control unit accesses the virtual space generated for the event according to opening of the event in the management server.

11. The information processing apparatus according to claim 9, wherein the content sharing start control unit receives an operation of starting to share the electronic content in the virtual space in which the event is generated.

12. An event realization method executed by a server that manages an event in which a plurality of users operating different information processing apparatuses share electronic content provided through a network, the event realization method comprising:

generating a virtual space in which the plurality of users can communicate with one another in event planning discussions and in which any one of the plurality of users can plan the event and specify which of the plurality of users are invited to the event, and accepting attendance to the event through each information processing apparatus;

receiving an operation of starting to share the electronic content at the event in the virtual space through the information processing apparatus and carrying out a process for starting to share the electronic content at the event; and receiving a registration of planning of the event including start date and time input to the information processing apparatus by one user, wherein during the event the plurality of users can continue to communicate with one another in the virtual space in mutually desirable discussions, and the generating step includes receiving, through the information processing apparatus, an operation in the virtual space for inviting a user attending another virtual space, performing control to display, in the other virtual space, information regarding the event, and accepting attendance of the user registered for attending the virtual space based on the displayed information.

13. A non-transitory, computer-readable recording medium containing a computer program, which when executed by a server causes the server to manage an event in which a plurality of users operating different information processing apparatuses share electronic content provided through a network, the computer program causing the server to carry out actions, comprising:

generating a virtual space in which the plurality of users can communicate with one another in event planning discussions and in which any one of the plurality of users can plan the event and specify which of the plurality of users are invited to the event, and accepting attendance to the event through each information processing apparatus; and receiving an operation of starting to share the electronic content at the event in the virtual space through the information processing apparatus and carrying out a process for starting to share the electronic content at the event; and receiving a registration of planning of the event including start date and time input to the information processing apparatus by one user, wherein during the event the plurality of users can continue to communicate with one another in the virtual space in mutually desirable discussions, and the generating step includes receiving, through the information processing apparatus, an operation in the virtual space for inviting a user attending another virtual space, performing control to display, in the other virtual space, information regarding the event, and accepting attendance of the user registered for attending the virtual space based on the displayed information.

* * * * *